US010870435B2

(12) United States Patent
Fujisawa et al.

(10) Patent No.: US 10,870,435 B2
(45) Date of Patent: Dec. 22, 2020

(54) NOTICE MANAGEMENT APPARATUS AND NOTICE MANAGEMENT METHOD

(71) Applicant: DENSO CORPORATION, Kariya (JP)

(72) Inventors: Yuki Fujisawa, Kariya (JP); Norio Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/767,975

(22) PCT Filed: Sep. 6, 2016

(86) PCT No.: PCT/JP2016/076080
§ 371 (c)(1),
(2) Date: Apr. 12, 2018

(87) PCT Pub. No.: WO2017/064941
PCT Pub. Date: Apr. 20, 2017

(65) Prior Publication Data
US 2018/0297611 A1 Oct. 18, 2018

(30) Foreign Application Priority Data

Oct. 16, 2015 (JP) ................................. 2015-204865

(51) Int. Cl.
*B60W 50/14* (2020.01)
*G08G 1/16* (2006.01)
(Continued)

(52) U.S. Cl.
CPC ...... *B60W 50/14* (2013.01); *B60W 30/18163* (2013.01); *B60W 50/16* (2013.01);
(Continued)

(58) Field of Classification Search
CPC ................. B60W 50/14; B60W 50/16; B60W 30/18163; B60W 2050/146;
(Continued)

(56) References Cited

U.S. PATENT DOCUMENTS

2006/0220904 A1* 10/2006 Jarlengrip ............ B62D 15/029
340/901
2012/0078500 A1* 3/2012 Yamada ................ B60W 50/14
701/301
2017/0337813 A1* 11/2017 Taylor .................. G08G 1/0141

FOREIGN PATENT DOCUMENTS

JP        2003-051100        2/2003
JP        2006-284458 A      10/2006
(Continued)

OTHER PUBLICATIONS

U.S. Appl. No. 15/549,491, filed Jan. 25, 2018, Iguchi, Corresponding to JP 2015-23622.
(Continued)

*Primary Examiner* — Rodney A Butler
(74) *Attorney, Agent, or Firm* — Maschoff Brennan

(57) ABSTRACT

A notice management apparatus controls a notice instrument that provides a notice to an occupant of a vehicle. The notice instrument is mounted to the vehicle together with a vehicle control apparatus that achieves an assistance function assisting a lane change of the vehicle. The notice management apparatus includes a start time obtainer section and a notice adjuster section. The start time obtainer section obtains the information which indicates a steering start point of time at which the vehicle control apparatus starts a lane change of the vehicle. The notice adjuster section causes the notice instrument to provide continuously a notice indicating a decrease in a residual period of time up to the steering start point of time obtained by the start time obtainer section.

24 Claims, 12 Drawing Sheets

(51) Int. Cl.
- *B62D 15/02* (2006.01)
- *G01C 21/36* (2006.01)
- *B60W 30/18* (2012.01)
- *G08G 1/09* (2006.01)
- *B60W 50/16* (2020.01)
- *G05D 1/02* (2020.01)
- *G08G 1/0962* (2006.01)
- *G01C 21/34* (2006.01)

(52) U.S. Cl.
CPC ....... *B62D 15/029* (2013.01); *B62D 15/0255* (2013.01); *G01C 21/365* (2013.01); *G01C 21/3655* (2013.01); *G01C 21/3658* (2013.01); *G05D 1/0212* (2013.01); *G08G 1/09626* (2013.01); *G08G 1/167* (2013.01); *B60W 2050/143* (2013.01); *B60W 2050/146* (2013.01); *B60W 2520/10* (2013.01); *B60W 2540/00* (2013.01); *B60W 2540/22* (2013.01); *B60W 2710/20* (2013.01); *G01C 21/34* (2013.01); *G05D 2201/0213* (2013.01)

(58) Field of Classification Search
CPC ....... B60W 2540/22; B60W 2050/143; B60W 2520/10; B60W 2540/00; B60W 2710/20; B62D 15/029; B62D 15/0255; G08G 1/167; G08G 1/09626; G05D 1/0212; G05D 2201/0213; G01C 21/3655; G01C 21/365; G01C 21/3658; G01C 21/34
See application file for complete search history.

(56) References Cited

FOREIGN PATENT DOCUMENTS

| | | |
|---|---|---|
| JP | 2009-047491 | 9/2009 |
| JP | 2009-281832 | 12/2009 |
| JP | 2010-203887 | 9/2010 |
| JP | 2012-216203 | 11/2012 |
| JP | 2014-224768 A | 12/2014 |
| JP | 2015-011458 | 1/2015 |
| JP | 2015074426 A | 4/2015 |
| JP | 2015-141476 | 8/2015 |

OTHER PUBLICATIONS

U.S. Appl. No. 15/561,923, filed Sep. 26, 2017, Mori, et al., Corresponding to JP 2015-077084, JP 2015-24333.
Bosch User experience for automated driving_1.mp4, Jun. 15, 2015 with an excerpt in PDF.

* cited by examiner

NOTICE MANAGEMENT APPARATUS AND NOTICE MANAGEMENT METHOD

CROSS REFERENCE TO RELATED APPLICATION

The present application is based on Japanese Patent Application No. 2015-204865 filed on Oct. 16, 2015, the disclosure of which is incorporated herein by reference.

TECHNICAL FIELD

The present disclosure relates to a notice management apparatus and a notice management method, which control a notice instrument providing a notice to an occupant of a vehicle.

BACKGROUND ART

For instance, Patent literature 1 discloses a navigation apparatus that indicates a lane change to a driver of a vehicle by controlling a speaker of the vehicle. This navigation apparatus can change a point of time of indicating such a lane change depending on a travel speed of the vehicle or a surrounding traffic congestion condition, for instance.

PRIOR ART LITERATURES

Patent Literature

Patent literature 1: JP 2009-047491 A

SUMMARY OF INVENTION

There is promoted an installment of a vehicle control apparatus to a vehicle for achieving an assistance function of assisting a lane change. This vehicle control apparatus installed in a vehicle can start automatically a lane change by sensing a state of surrounding of the vehicle, for instance. This may relieve a driver from the driving load for steering the vehicle, but may make it difficult for the driver to recognize the start point of time of starting the lane change.

The navigation apparatus disclosed in Patent literature 1 is not considered to be installed in the vehicle having the above vehicle control apparatus. Thus, even if the navigation apparatus is installed in the vehicle, it is difficult for an occupant of the vehicle to recognize the start point of time of a lane change. The vehicle control apparatus may thus provide an assistance function to move the vehicle in a lateral direction at a point of time which the occupant of the vehicle does not intend. This may induce an uneasiness of the occupant of the vehicle.

It is an object of the present disclosure to provide a technology capable of reducing an uneasiness of an occupant of a vehicle that is subjected to a lane change by an assistance function of a vehicle control apparatus.

To achieve the above object, according to an aspect of the present disclosure, a notice management apparatus is provided as controlling a notice instrument providing a notice to an occupant of a vehicle. The notice instrument is installed to the vehicle together with a vehicle control apparatus achieving an assistance function of assisting a lane change. The notice management apparatus includes a start time obtainer section and a notice adjuster section. The start time obtainer section obtains information indicating a steering start point of time at which the vehicle control apparatus starts a lane change of the vehicle. The notice adjuster section causes the notice instrument to continuously provide a notice indicating a decrease in a residual period of time up to the steering start point of time obtained by the start time obtainer.

Such a configuration allows the notice instrument controlled by the notice adjuster section to continue providing a notice of a decrease in a residual period of time left up to the start point of time of a lane change by the vehicle control apparatus. The occupant of the vehicle can thus easily recognize the point of time at which the vehicle moves in a lateral direction. The notice management apparatus enables the vehicle that changes a lane with an assistance function of the vehicle control apparatus to reduce an uneasiness of an occupant of the vehicle.

According to another aspect, a notice management method for managing a notice by a notice instrument is provided as follows. The notice instrument is mounted to a vehicle together with a vehicle control apparatus achieving an assistance function assisting a lane change; the notice is provided to an occupant of the vehicle. The notice management method is executed by at least one processor. The notice management method includes: a start time obtaining configured to obtain information indicating a steering start point of time at which a lane change of the vehicle is started by the vehicle control apparatus; and a notice adjusting configured to cause the notice instrument to provide continuously a notice indicating a decrease in a residual period of time up to the steering start point of time obtained in the start time obtaining.

This configuration also allows an occupant of the vehicle to easily understand the point of time at which the vehicle starts to move in a lateral direction. The vehicle that changes a lane with an assistance function of the vehicle control apparatus is enabled to reduce an uneasiness of an occupant of the vehicle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following describes several embodiments of the present disclosure with reference to drawings. A component commonly provided in the embodiments is assigned with the same reference sign, eliminating repetition of explanation. When only part of the configuration of each embodiment is explained, the other part of the configuration may adopt those of the precedent embodiment previously explained. Partial combination between configurations of the embodiments may be possible with respect to not only a configuration which is explicitly described in each embodiment, but also a configuration which is not explicitly described if any trouble does not arise. A combination of configurations that is not explicitly described in a plurality of embodiments or modification examples is supposed to be disclosed by the following explanations.

First Embodiment

Figure 1:
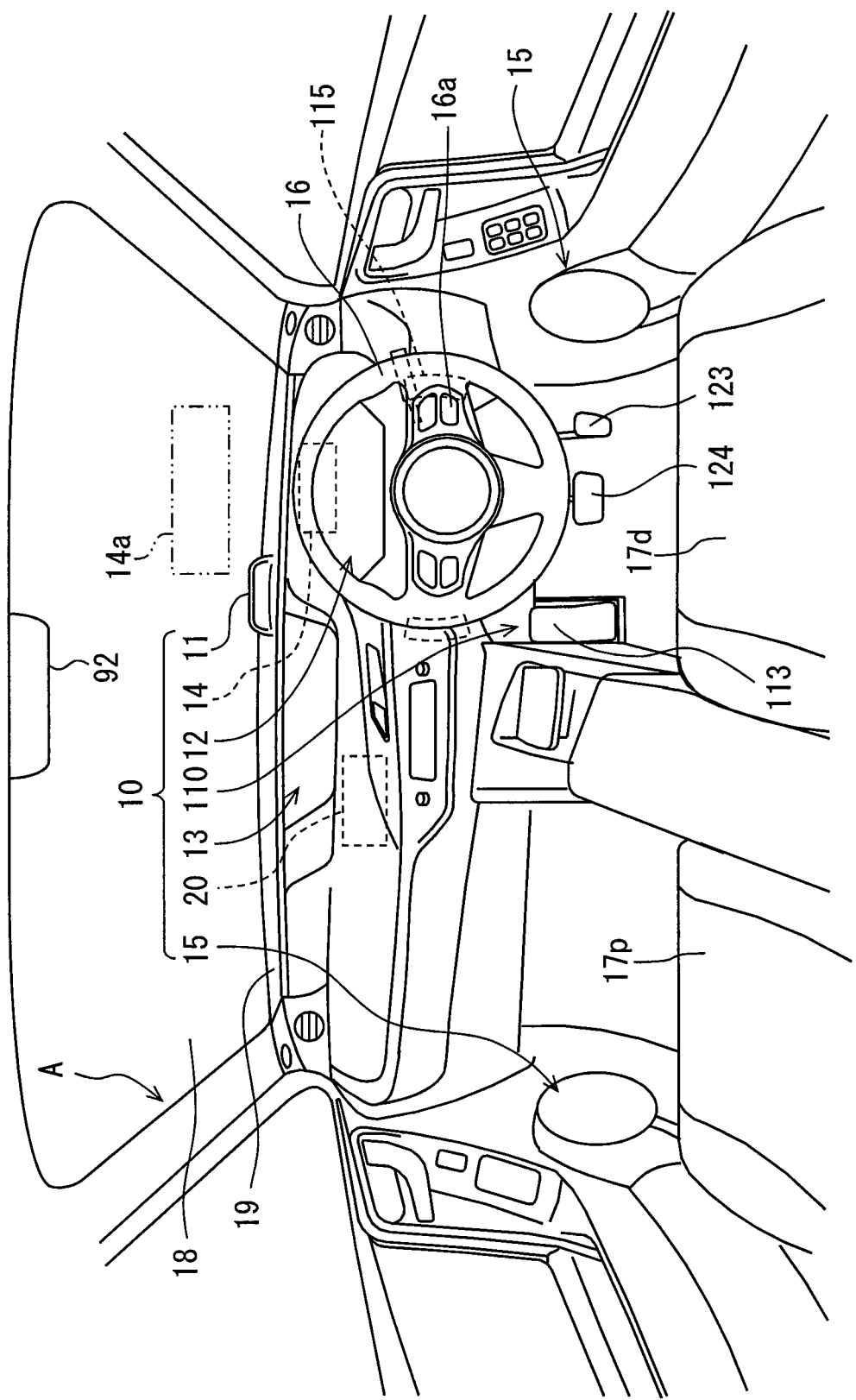
FIG. 1 is a diagram illustrating a layout around a driver seat in a vehicle.
Figure 2:
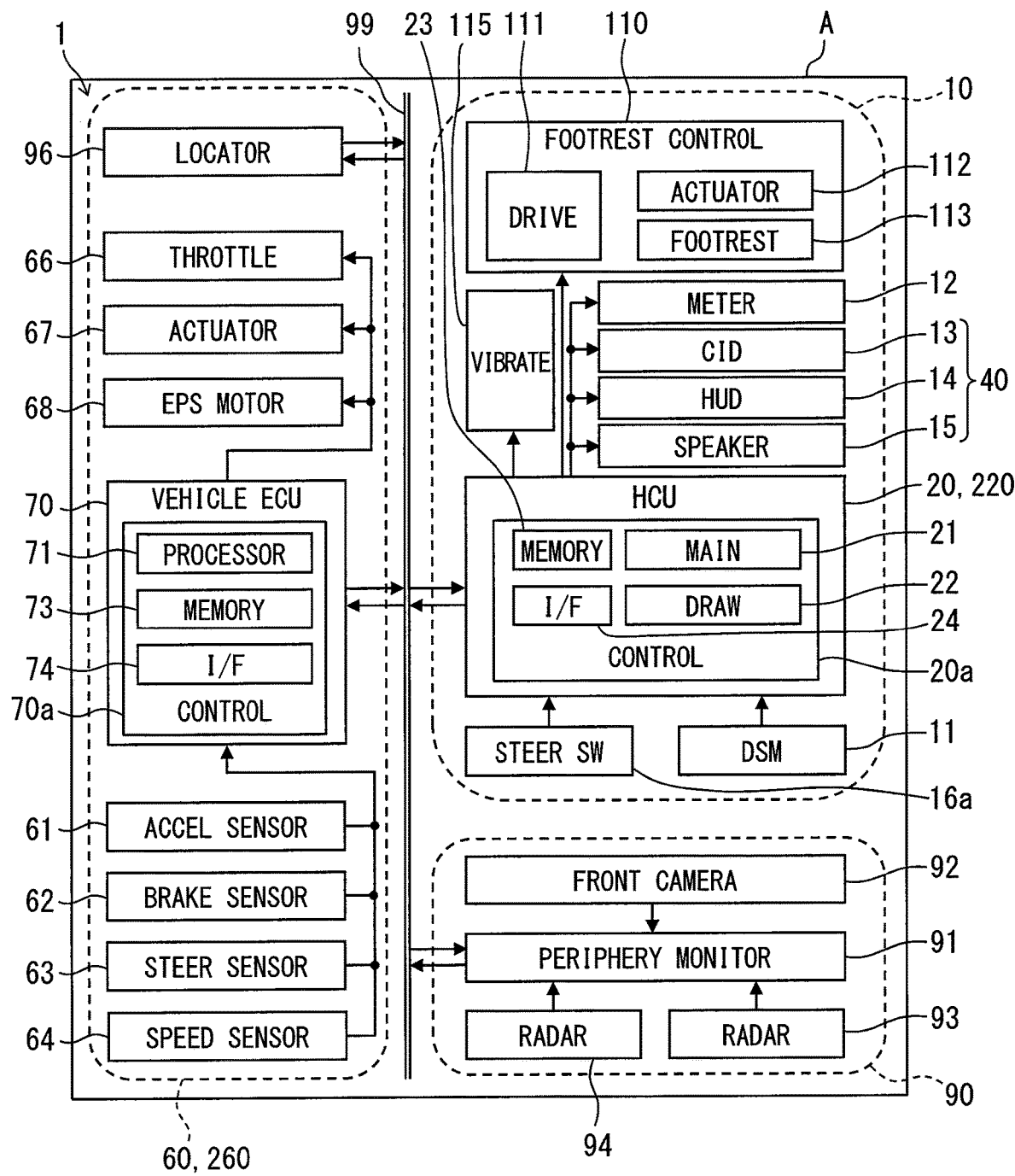
FIG. 2 is a block diagram illustrating an overall configuration of an in-vehicle network.

An HCU 20 according to a first embodiment to which the present disclosure is applied is an electronic apparatus mounted in a vehicle A (also referred to as a host vehicle), as indicated in FIG. 1 and FIG. 2. The HCU (Human machine interface Control Unit) 20 is one of a plurality of nodes provided in an in-vehicle network 1 mounted in the vehicle A. The in-vehicle network 1 includes an ADAS locator 96, an external recognition system 90, a vehicle control system 60, and an HMI system 10. These components, which are connected via a communication bus 99, exchange the information with each other by communication. Note that "information," which may be used not only as an uncountable noun but also a countable noun, is equivalent to an informational item. One information is equivalent to one informational item; a plurality of informations are equivalent to a plurality of informational items.

The ADAS (Advanced Driver Assistance Systems) locator 96 includes a GNSS receiver, inertial sensors such as a gyro sensor, and a memory which stores map data. The GNSS (Global Navigation Satellite System) receiver receives positioning signals from a plurality of artificial satellites. The ADAS locator 96 measures a position of the vehicle A by combining positioning signals received by the GNSS receiver and measurement results of the inertial sensors. The ADAS locator 96 reads the map data corresponding to an area ahead of a host vehicle from the memory, and extracts the road information such as a curvature radius, an angle of rotation, a starting position of a curve. The ADAS locator 96 outputs (i) the position information on the vehicle A, and (ii) the information of a road ahead of the vehicle A, to the communication bus 99.

The external recognition system 90 includes (i) a periphery monitoring ECU 91 and (ii) an external sensor such as a front camera unit 92, radar units 93, 94. The external recognition system 90 detects a mobile object or a static object; the mobile object includes a pedestrian, an animal other than a human being, a bicycle, a motorcycle, or a different vehicle, while the static object includes a falling object on a road, a traffic light, a guardrail, a curbstone, a road sign, a traffic sign painted on a road, a compartment line, or a tree. In addition to the units 92 to 94, the external recognition system 90 can further include an external sensor such as a lidar or sonar.

The front camera unit 92, which includes a single lens or a plurality of lens, is installed in the proximity of a rearview mirror of the vehicle A, for instance. The front camera unit 92, which is directed to the heading direction of the vehicle A, captures an image in a range of about 80 meters from the vehicle A with a horizontal viewing angle of about 45 degrees. The front camera unit 92 outputs successively the data of captured images capturing a mobile object or static object to the periphery monitoring ECU 91.

The radar unit 93 is installed at a front portion of the vehicle A, for instance. The radar unit 93 emits the millimeter waves of 77 GHz band to the heading direction of the vehicle A from a transmission antenna. The radar unit 93 receives the millimeter wave reflected by a mobile object or static object via a reception antenna. The radar unit 93 scans a range of about 60 meters from the vehicle A with a horizontal scanning angle of about 55 degrees. The radar unit 93 outputs the scanning result based on the received signal to the periphery monitoring ECU 91 successively.

The radar units 94 are installed individually at a rear left portion and a rear right portion of the vehicle A, for instance. The radar units 94 emit the submillimeter waves of 24 GHz band to an area behind or diagonally behind the vehicle A via the transmission antenna. The radar units 94 receive the submillimeter waves reflected by a mobile object or static object that is present in an area behind or diagonally behind the vehicle A via the reception antenna. The radar units 94 each scan a range of about 30 meters from the vehicle A with a horizontal scanning angle of about 120 degrees. The radar units 94 output the scanning results based on the received signals to the periphery monitoring ECU 91 successively.

The periphery monitoring ECU 91 is configured to be mainly a microcomputer or microcontroller which includes a processor, RAM, and memory. The periphery monitoring ECU 91 is connected with the front camera unit 92, the radar units 93 and 94, and the communication bus 99 to communicate with them. The periphery monitoring ECU 91 integrates the information obtained from the respective units 92 and 93, thereby detecting a relative position of a mobile object or a static object in the heading direction. In addition, the periphery monitoring ECU 91 obtains the information from the radar units 94, thereby detecting a relative position of a mobile object or a static object in an area behind or diagonally behind the vehicle A.

Figure 8:
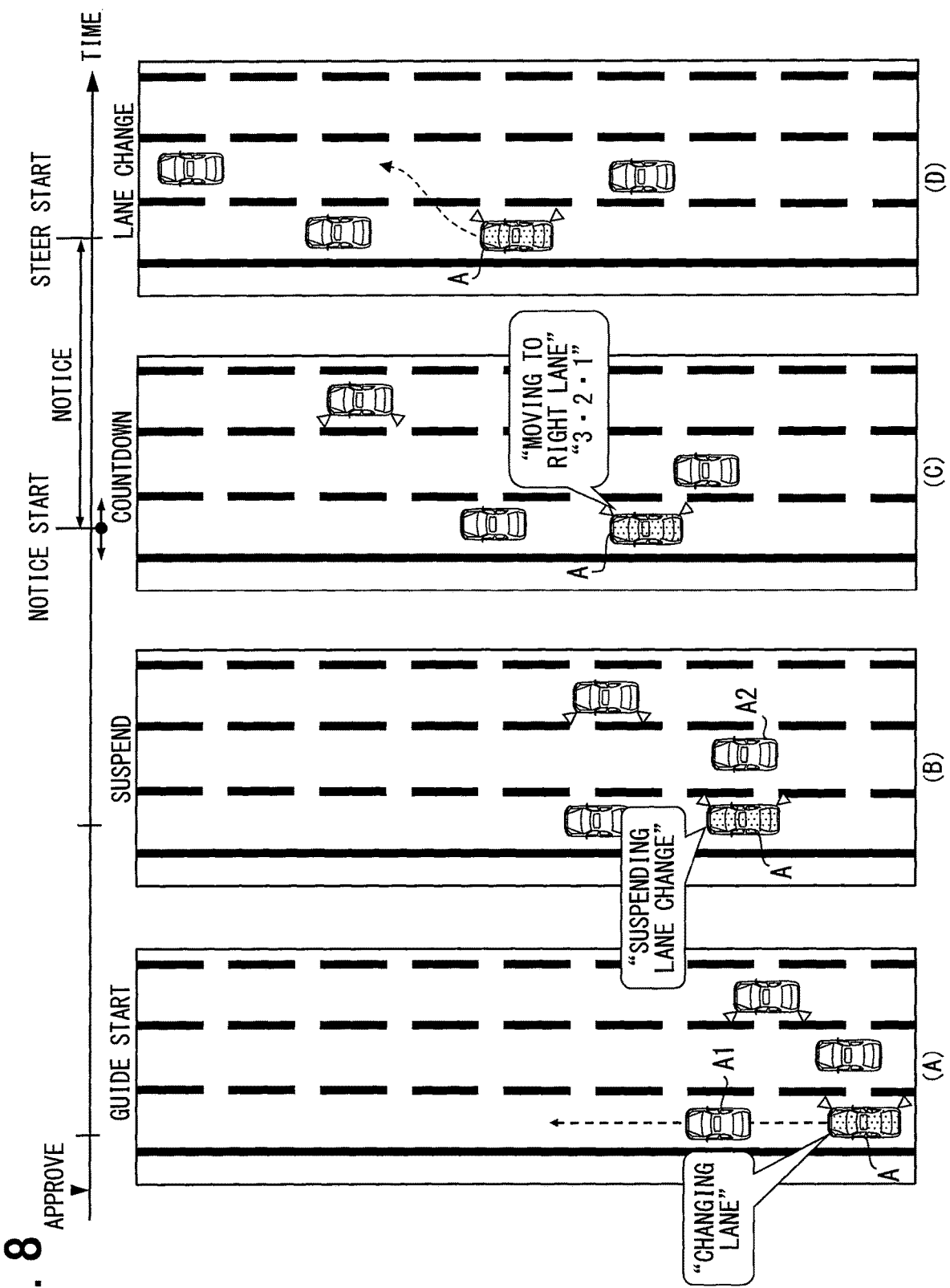
FIG. 8 is a diagram illustrating one example of states where a lane change of a vehicle is indicated with a countdown.

The periphery monitoring ECU 91 outputs the monitoring information via the communication bus 99; the monitoring information includes (i) the information on relative position of an ahead-travelling vehicle A1 (refer to (A) in FIG. 8) that is a vehicle traveling ahead of the vehicle A or a parallel-travelling vehicle A2 (refer to (B) in FIG. 8) that is a vehicle travelling side-by-side with the vehicle A, (ii) the information on congestion condition of the periphery of the host vehicle, and (iii) the information on shapes of compartment lines in the heading direction of the vehicle A. In addition, the periphery monitoring ECU 91 determines whether a lane change to an adjacent lane is possible based on the detection of the parallel-traveling vehicle A2 traveling the adjacent lane, thereby outputting a determination result to the communication bus 99 as the monitoring information.

The vehicle control system 60 includes: a detection sensor that detects a driving manipulation such as an accelerator position sensor 61, a brake stepping-on force sensor 62, and a steering angle sensor 63; and a speed sensor 64 that detects a travel state of the vehicle A. In addition, the vehicle control system 60 includes: (i) a vehicle control ECU 70, and (ii) travel control devices such as an electronically controlled throttle 66, a brake actuator 67, and an EPS (Electric Power Steering) motor 68. The vehicle control system 60 controls the travel of the vehicle A based on the driving manipulation by the driver, the monitoring information by the external recognition system 90, etc.

The accelerator position sensor 61 detects an amount of the stepping-on of the accelerator pedal 123 by the driver, and outputs it to the vehicle control ECU 70. The brake stepping-on force sensor 62 detects an amount of the stepping-on of the brake pedal 124 by the driver, and outputs it to the vehicle control ECU 70. The steering angle sensor 63 detects a steering angle of the steering wheel 16 (hereinafter, steering) by the driver, and outputs it to the vehicle control ECU 70. The vehicle speed sensor 64 measures a rotation speed of the output axis of the transmission or the axle, thereby detecting a current travel speed of the vehicle A to output it to the vehicle control ECU 70.

The electronically controlled throttle 66 controls an opening degree of the throttle based on the control signal outputted from the vehicle control ECU 70. The brake actuator 67 controls a braking force that is generated in each wheel due to an occurrence of a braking pressure based on the control signal outputted from the vehicle control ECU 70. The EPS motor 68 controls a force to steer and a force to hold steering which are applied to the steering mechanism based on the control signal outputted from the vehicle control ECU 70.

The vehicle control ECU 70 includes an integration control ECU at least; the vehicle control ECU 70 may further include a power unit control ECU and/or a brake control ECU in addition to the integration control ECU. The control circuit 70a of the vehicle control ECU 70 includes a processor 71, a memory 73 that is non-volatile and rewritable, an I/O interface 74 that performs input and output of the information, and a bus which connects the foregoing. The vehicle control ECU 70 is connected with the respective sensors 61 to 64 and the respective travel control devices. The vehicle control ECU 70 obtains the detection signal outputted from the respective sensors 61 to 64, and outputs the control signal to the respective travel control devices. In addition, the vehicle control ECU 70 is connected with the communication bus 99, communicating with the HCU 20 and the periphery monitoring ECU 91. The vehicle control ECU 70 is able to output detection signals of the respective sensors 61 to 64 to the communication bus 99.

Figure 3:
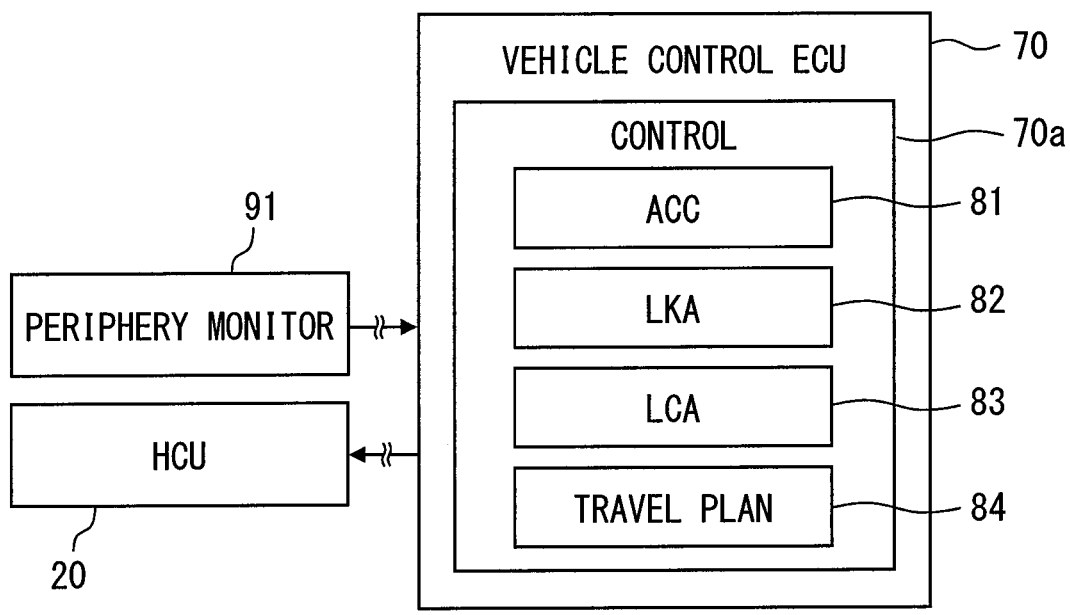
FIG. 3 is a diagram illustrating functional blocks in a control circuit of a vehicle control ECU.

The vehicle control ECU 70 controls the driving force, braking force, or steering force of the vehicle A, thereby providing a plurality of driving assistance functions that perform an assistance or a vicarious execution of driving manipulation by the driver. The vehicle control ECU 70 executes a program stored in the memory 73 using the processor 71, thereby configuring, as functional blocks, an ACC function section 81, an LKA function section 82, an LCA function section 83, and a travel planner section 84, as indicated in FIG. 3. The operation information in each driving assistance function by the functional blocks is outputted to the communication bus 99 by the vehicle control ECU 70, as illustrated in FIGS. 2 and 3.

The ACC (Adaptive Cruise Control) function section 81 adjusts a driving force or braking force based on the monitoring information of the ahead-traveling vehicle A1 (refer to (A) of FIG. 8) obtained from the periphery monitoring ECU 91, thereby achieving the function of ACC that controls the travel speed of the vehicle A. When not detecting any ahead-traveling vehicle A1, the ACC function section 81 causes the vehicle A to cruise with a target traveling speed set by the driver. In contrast, when detecting an ahead-traveling vehicle A1, the ACC function section 81 sets a target vehicle speed of the vehicle A to be a speed of the ahead-traveling vehicle A1, thereby maintaining an inter-vehicle distance up to the ahead-traveling vehicle A1 and causing the vehicle A to travel as following the ahead-traveling vehicle A1.

The LKA (Lane Keeping Assist) function section 82 adjusts the steering force, thereby achieving the function of the LKA that controls the rudder angle of the steering wheel of the vehicle A (refer to FIG. 1). The LKA function section 82 generates a steering force to the direction so as to prevent the approach to the compartment line, thereby maintaining the vehicle A in a currently traveling lane and causing the vehicle A to travel along the lane.

The LCA (Lane Change Assist) function section 83 achieves a function of lane change assistance that moves the vehicle A (refer to FIG. 1) from the currently traveling lane into an adjacent lane. Such a function of lane change assistance is enabled to be activated under states where both the ACC function and the LKA function operate simultaneously. The LCA function section 83 generates a steering force to the direction so as to permit an approach of the vehicle A to an adjacent lane when the lane change is enabled, thereby moving the vehicle A into the adjacent lane.

The travel planner section 84 generates a travel plan of the vehicle A corresponding to the monitoring information obtained from the periphery monitoring ECU 91. The travel plan includes, for instance, a short-term travel plan that indicates a lane change to an adjacent lane (refer to FIG. 8), and an intermediate-term travel plan that indicates a passing of an ahead-traveling vehicle A1 while performing a plurality of lane changes (refer to FIG. 10). Any travel plan includes the information that indicates a target steering direction and a target steering amount, the information that indicates a steering start point of time at which a lane change is started, and the information that indicates a target speed up to a lane change start. The travel plan is suitably adjusted based on a current travel speed of the host vehicle, or a degree of a driving load calculated from a situation of the periphery of the host vehicle. The travel planner section 84 is allowed to output the generated travel plan to the communication bus 99.

The travel planner section 84 calculates a schedule of a travel locus of the vehicle A according to the generated travel plan. The travel planner section 84 calculates a target steering direction and a target steering amount for achieving a travel of the vehicle A following the schedule of the travel locus. Such a target steering direction and a target steering amount calculated by the travel planner section 84 is used to permit the LCA function section 83 to control a steering or an acceleration/deceleration.

The HMI system 10 includes, in addition to the above-mentioned HCU 20, a plurality of display devices such as a combination meter 12, a CID 13, and an HUD apparatus 14. The HMI system 10 further includes an audio speaker 15, a steering switch 16a, a footrest control apparatus 110, a steering wheel vibrating apparatus 115, and a DSM 11. The HMI system 10 presents the information using each component to the driver of the vehicle A who is seated in a driver seat 17d, and another occupant of the vehicle A.

The combination meter 12 is arranged in a region in front the driver seat 17d. The combination meter 12 displays the various images for the information notice on a display screen of a liquid crystal display based on the image data obtained from the HCU 20. The CID (Center Information Display) 13 is arranged in a region above a center cluster in the vehicle compartment of the vehicle A. The liquid crystal display of the CID 13 can be viewed by not only the driver but also a passenger of the vehicle A other than the driver, such as an occupant seated in a front passenger seat 17p. The CID 13 displays the various images for the information notice on a display screen of a liquid crystal display based on the image data obtained from the HCU 20.

Figure 5:
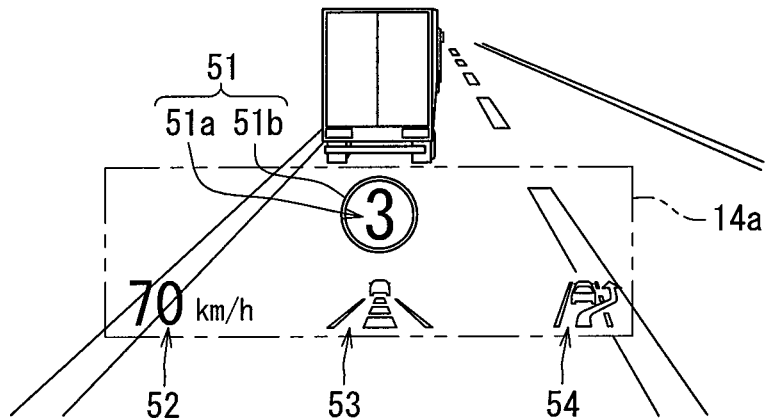
FIG. 5 is a diagram illustrating a view of a countdown by an HUD apparatus.

The HUD (Head-Up Display) apparatus 14 projects the light of pictures based on the image data obtained from the HCU 20 on a projection area 14a that is defined in the windshield 18 (also refer to FIG. 5). The windshield 18 reflects the light of the pictures towards the vehicle compartment so as to be viewed by the driver who is seated in the driver seat 17d. The driver is able to see the virtual image of the pictures projected by the HUD apparatus 14 to be superimposed on an external scenery ahead of the vehicle A.

The audio speaker 15 is arranged in a lining of a door of the vehicle A. The audio speaker 15 is arranged to be adjacent to each of the driver seat 17d and the passenger seat 17p. The audio speaker 15 reproduces a sound which can be caught by all the occupants of the vehicle A. The audio speaker 15 can perform the information notice to all the occupants by sound that is reproduced.

The steering switch 16a is arranged at a spoke part of the steering wheel 16 of the vehicle A. The steering switch 16a receives a manipulation by the driver changing the setup of each of the HMI system 10 and the vehicle control system 60. For example, when the HMI system 10 proposes an activation of each driving assistance function, the driver can approve the activation of the proposed driving assistance function by inputting a manipulation to the steering switch 16a.

The footrest control apparatus 110 can change the posture of the footrest 113 in which the driver's left leg is placed. The footrest control apparatus 110 includes an actuator 112 and a footrest driver part 111, in addition to the footrest 113. The actuator 112 can usually change the posture of the footrest 113 from a reference posture at normal time. The footrest driver part 111 drives the actuator 112, thereby inclining the footrest 113 from front to back and from side to side. The footrest driver part 111 obtains a control signal from the HCU 20, thereby setting a direction in which the footrest 113 is displaced. The footrest control apparatus 110 can present the information through the driver's tactile sense.

The steering wheel vibrating apparatus 115 is laid under a rim part of the steering wheel 16. The steering wheel vibrating apparatus 115 generates a vibration in the rim part of the steering wheel 16 which the driver touches. Due to the vibration generated in the rim part, the steering wheel vibrating apparatus 115 can present the information through the driver's tactile sense. The steering wheel vibrating apparatus 115 can change the vibration frequency of the vibration that the driver senses.

The DSM (Driver Status Monitor) 11 includes a near-infrared light source, a near-infrared camera, and a control unit that controls the foregoing. The DSM 11 is arranged at an upper surface of the instrument panel 19 while having the posture which turns the near-infrared camera towards the driver seat 17d. The DSM 11 captures an image of the face of the driver who is irradiated with the near-infrared light from the near-infrared light source, by using the near-infrared camera. The captured image by the near-infrared camera is subjected to an image analysis by the control unit. The control unit extracts the direction of the driver's face, the sight line direction of both eyes, opening condition, etc. from the captured image, for example. When detecting the state where the driver fails to face the front and the state where the eyes of the driver are closed based on the analysis by the control unit, the DSM 11 outputs a detection signal which indicates the driver's anomaly to the HCU 20.

The HCU 20 includes a control circuit 20a (also referred to as an electronic control unit) that contains a main processor 21, a drawing processor 22, a rewritable non-volatile memory 23, an I/O interface 24 that performs input and output of the information, and a bus that connects the foregoing. The HCU 20 is connected with each display device, the audio speaker 15, the footrest control apparatus 110, and the steering wheel vibrating apparatus 115. The HCU 20 controls each display device, the audio speaker 15, and the footrest control apparatus 110, thereby enabling the occupant such as the driver to be, in advance, notified of a change in the behavior of the vehicle A by the driving assistance function.

Figure 4:
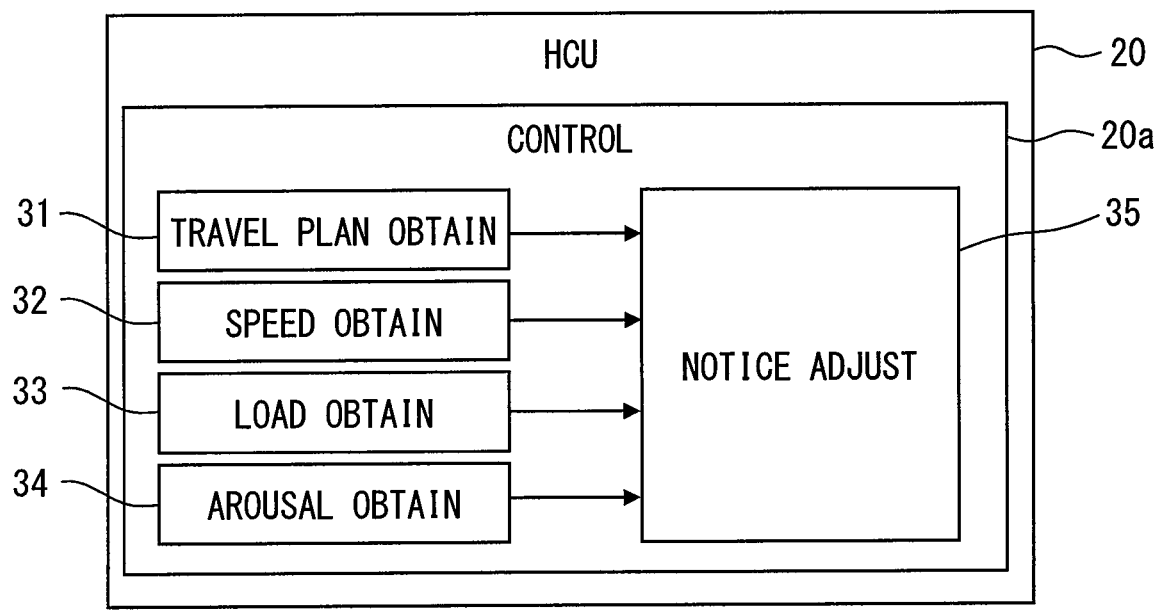
FIG. 4 is a diagram illustrating functional blocks in a control circuit of an HCU.

In order to achieve such an advance notice, the control circuit 20a of the HCU 20 causes the processors 21 and 22 to execute a notice control program stored in the memory 23, thereby configuring a plurality of obtainer sections 31 to 34 and a notice adjuster section 35 as functional blocks. The following explains details of the functional blocks related to the information provision based on FIG. 5 while referring to FIG. 1 and FIG. 4.

The travel plan obtainer section 31, which is also referred to as a travel plan obtainer 31, obtains short-term and intermediate-term travel plans generated by the travel planner section 84. The travel plans include the information that indicates a steering start point of time at which a lane change of the vehicle A is started by the vehicle control ECU 70, and the information that indicates a trend of the travel speed of the vehicle A adjusted up to the lane change. The vehicle speed obtainer section 32, which is also referred to as a vehicle speed obtainer 32, obtains the information indicating a current travel speed of the vehicle A that is detected by the speed sensor 64 and outputted to the communication bus 99 by the vehicle control ECU 70.

The load obtainer section 33, which is also referred to as a load obtainer 33, obtains the information which indicates a degree of the load for monitoring, in particular, the periphery of the vehicle A among the driving loads of the driver. In specific, the load obtainer section 33 obtains the configuration information on a front road outputted from the ADAS locator 96, and the monitoring information on a congestion condition of the periphery of the host vehicle outputted from the external recognition system 90. The load obtainer section 33 calculates the degree of the current driving load to be higher when the road in the heading direction is shaped of a curve, or when the vehicle is estimated to be traveling under a traffic congestion.

The arousal obtainer section 34, which is also referred to as an arousal obtainer 34, obtains the information which indicates a degree of arousal of the driver such as whether the driver is in a careless state or drowse state. The arousal obtainer section 34 obtains a detection signal relative to the driver state such as an opening condition of the driver's eyes from the DSM 11. The arousal obtainer section 34 estimates the degree of the arousal of the driver to be low when the state where the opening degree of the eyes is low continues.

The notice adjuster section 35, which may be also referred to as a notice adjuster 35 or a notice controller section 35, receives the information obtained by each obtainer section 31 to 34. The notice adjuster section 35 continuously reports a decrease in the residual period of time up to a steering start point of time that is a point of time of starting the steering by the control of the LCA function section 83, via the HUD apparatus 14, the audio speaker 15, the footrest control apparatus 110, and the steering wheel vibrating apparatus 115. The notice adjuster section 35 mainly controls, as notice instruments 40, the HUD apparatus 14, the audio speaker 15, and the steering wheel vibrating apparatus 115, thereby reporting the residual period of time up to the lane change to the occupant via display images, sounds, and vibration, respectively. In detail, the notice adjuster section 35 performs a countdown of numbers as the residual period of time up to the steering start point of time decreases.

The notice adjuster section 35 can adjust the notice start point of time at which the report of the residual period of time up to the steering start point of time is started. The notice adjuster section 35 performs an adjustment which makes the notice start point of time earlier, when the driver is under states of needing more time in order to recognize the notice of the lane change. The notice adjuster section 35 can make the notice start point of time earlier by making the notice start point of time have a longer preliminary interval before the steering start point of time, as a future scheduled travel speed obtained by the travel plan obtainer section 31 and a current travel speed obtained by the vehicle speed obtainer section 32 become faster. In addition, as the driving load of the driver is greater, the notice adjuster section 35 can set the notice start point of time to have a longer preliminary interval up to the steering start point of time. In addition, as the degree of arousal of the driver is less, the notice adjuster section 35 can set the notice start point of time to have a longer preliminary interval up to the steering start point of time. The notice adjuster section 35 increases the numerical value at the time of starting the countdown, thereby making earlier the notice start point of time that is set to have a longer preliminary interval up to the steering start point of time. That is, the countdown, which is usually starting from "3", is started, for example, from "5" under the state where the driver requires more time.

When the LCA function section 83 repeats the lane changes in a plurality of repetition times equal to or greater than threshold repetition times, the notice adjuster section 35 adjusts the length of the continued duration in which the report of the residual period of time is continued, between (i) in the first time and (ii) in and after the second time. In specific, the notice adjuster section 35 sets the continued duration in which the report of the residual period of time is continued, in and after the second time to be shorter than that in the first time.

Figure 6:
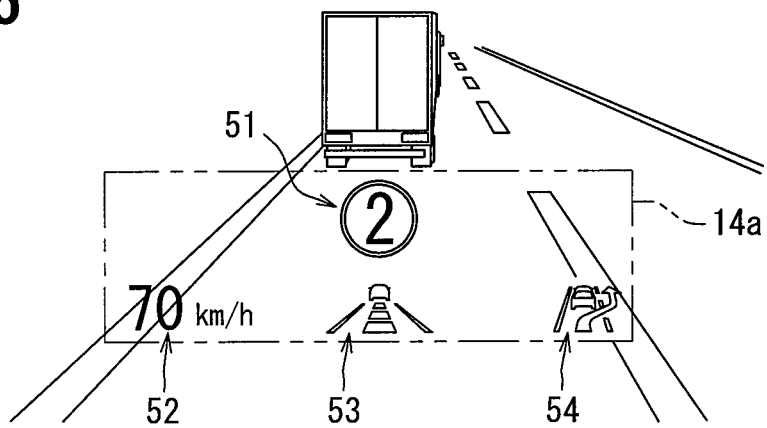
FIG. 6 is a diagram illustrating a view of a countdown one second after FIG. 5.
Figure 7:
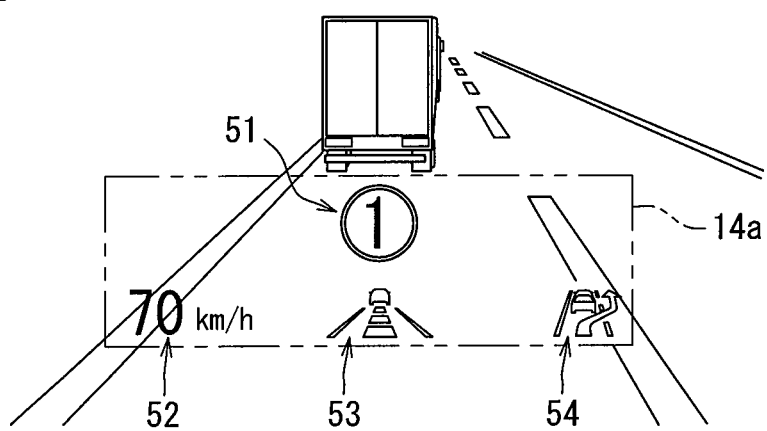
FIG. 7 is a diagram illustrating a view of the countdown one second after FIG. 6 and just before a start of a lane change.

The details of the countdown display by the HUD apparatus 14 are explained with reference to FIG. 5 to FIG. 7. The virtual images of the countdown display part 51, the speed display part 52, the ACC/LKA indicator 53, and the LCA indicator 54 are illustrated on the projection area 14a.

The countdown display part 51 is illustrated on a laterally central and longitudinally upper region in the projection area 14a. The countdown display part 51 is a combination of a numerical image 51a and a circular ring image 51b surrounding the periphery of the numerical image 51a. The numerical image 51a is located inside the ring image 51b. The numerical image 51a displays, in Arabic numerals, the residual period of time up to the point of time at which a lateral movement accompanying a lane change is started. The numerical value of the numerical image 51a decreases one by one per second. The numerical value displayed first in the numerical image 51a is adjusted by the notice adjuster section 35.

The speed display part 52, the ACC/LKA indicator 53, and the LCA indicator 54 are illustrated to be arranged side by side in a horizontal direction on a longitudinally lower region in the projection area 14a. The speed display part 52 displays a current travel speed of the vehicle A. The ACC/LKA indicator 53 is located below the countdown display part 51. The ACC/LKA indicator 53 displays an operating state of the ACC function section 81 using an icon of an ahead-traveling vehicle imitating an ahead-traveling vehicle and an icon of inter-vehicle distance having a belt-like shape extended towards the icon of the ahead-traveling vehicle. The ACC/LKA indicator 53 displays an operating state of the LKA function part 82 using an icon of a lane illustrated in lines at both the left side and the right side of the icon of the inter-vehicle distance. The LCA indicator 54 reports, by display, a notice indicating that the lane change assistance by the LCA function part 83 functions under a valid state.

The following explains the state where the start of a lane change is guided using the countdown display part 51 and the audio speaker 15 with reference to FIG. 8 to FIG. 11.

The state in FIG. 8 is to provide the driver with a proposal to activate the LCA function section 83 in response to that the vehicle A under cruise becomes close to an ahead-traveling vehicle A1 due to the driving assistance functions of the ACC function section 81 and the LKA function section 82. In order to avoid the ahead-traveling vehicle A1, the travel planner section 84 generates a travel plan that moves the vehicle A that is running a currently traveling lane located in the left side among three lanes into the intermediate lane on the right side of the currently traveling lane.

In response to a manipulation by the driver via the steering switch 16a approving a lane change according to the travel plan, both (i) the flashing of the turn indicator and (ii) the guidance with speech are started (refer to (A) of FIG. 8). At this time, for instance, the speech such as "starting the lane change assistance," or "changing lane" is reproduced as a guidance to be announced inside of the vehicle compartment.

The start of the lane change is suspended based on a negative determination of the periphery monitoring ECU 91, for instance, in cases that a parallel-traveling vehicle A2 is present in the lane which the vehicle A is going to move to enter. At this time, in order to report a suspended state of the lane change, for example, the speech such as "the lane change is suspended due to a vehicle present in the neighboring lane" or "suspending lane change" is reproduced as a guidance to be announced inside of the vehicle compartment (refer to (B) of FIG. 8).

In response to the release of the suspension of the lane change, the countdown up to the steering start is started (refer to (C) of FIG. 8). This countdown is performed with the speed counting one numerical character per second. The notice start point of time starting the countdown is obtained by the back calculation from the steering start point of time at which the start of the lane change is allowed. This notice start point of time is adjusted depending on the state of the vehicle A, the surrounding traffic state, the driver's state, etc. The guidance related to the countdown is such as "starting the movement to the right lane" and "3, 2, 1", or "moving to right lane" and "3, 2, 1". According to this guidance, the countdown using the virtual image by the countdown display part 51 is performed (refer to FIG. 5-FIG. 7). In addition, the footrest control apparatus 110 displaces the footrest 113 so as to synchronize with the countdown, thereby performing the notice through the tactile sense. Furthermore, the steering wheel vibrating apparatus 115 also performs the notice through the tactile sense by generating the vibration in the steering wheel 16 to synchronize with the countdown. The steering wheel vibrating apparatus 115 changes the frequency of the generated vibration to be higher step by step with the decrease in the residual period of time up to the steering start while matching with the speech of the countdown.

During the above countdown being performed, the LCA function part 83 adjusts the speed of the vehicle A with acceleration and/or deceleration. After completing the countdown, the LCA function part 83 starts the steering of the front wheel from the steering start point of time (refer to (D) of FIG. 8). In such a way, the vehicle A starts the movement into the intermediate lane.

The above-explained notice continued duration in which the countdown is continued is adjusted depending on the travel speed of the vehicle A, the real-time driving load of the driver, and the real-time arousal degree of the driver. For example, suppose that the cruising speed of the vehicle A corresponds to a speed higher than that in the scene indicated in (B) of FIG. 8. In such a case, the guidance related to the countdown is such as "starting the movement to the right lane" and "5, 4, 3, 2, 1".

Figure 9:
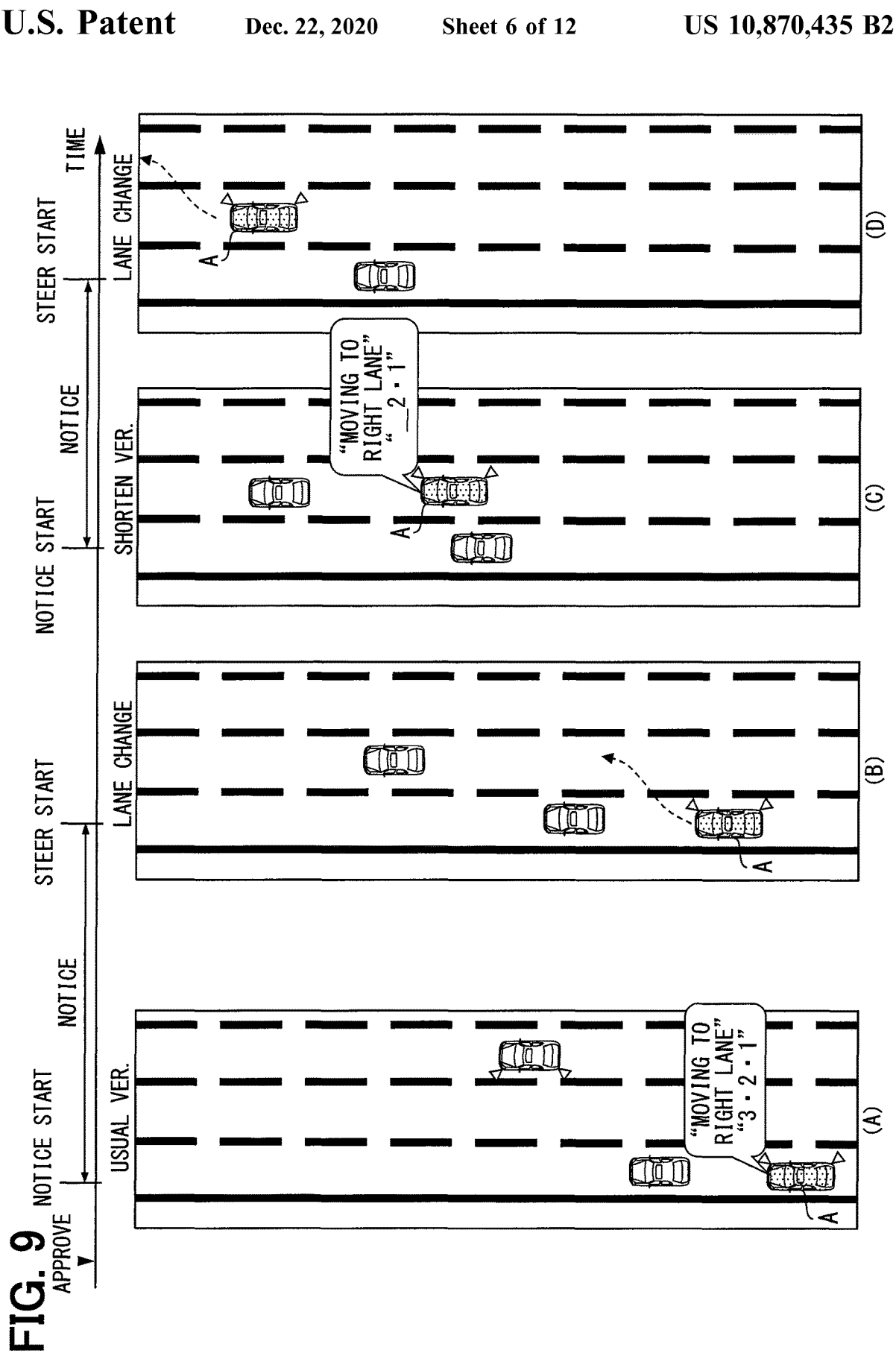
FIG. 9 is a diagram illustrating one example of states where a plurality of lane changes of a vehicle are indicated individually with respective countdowns.
Figure 10:
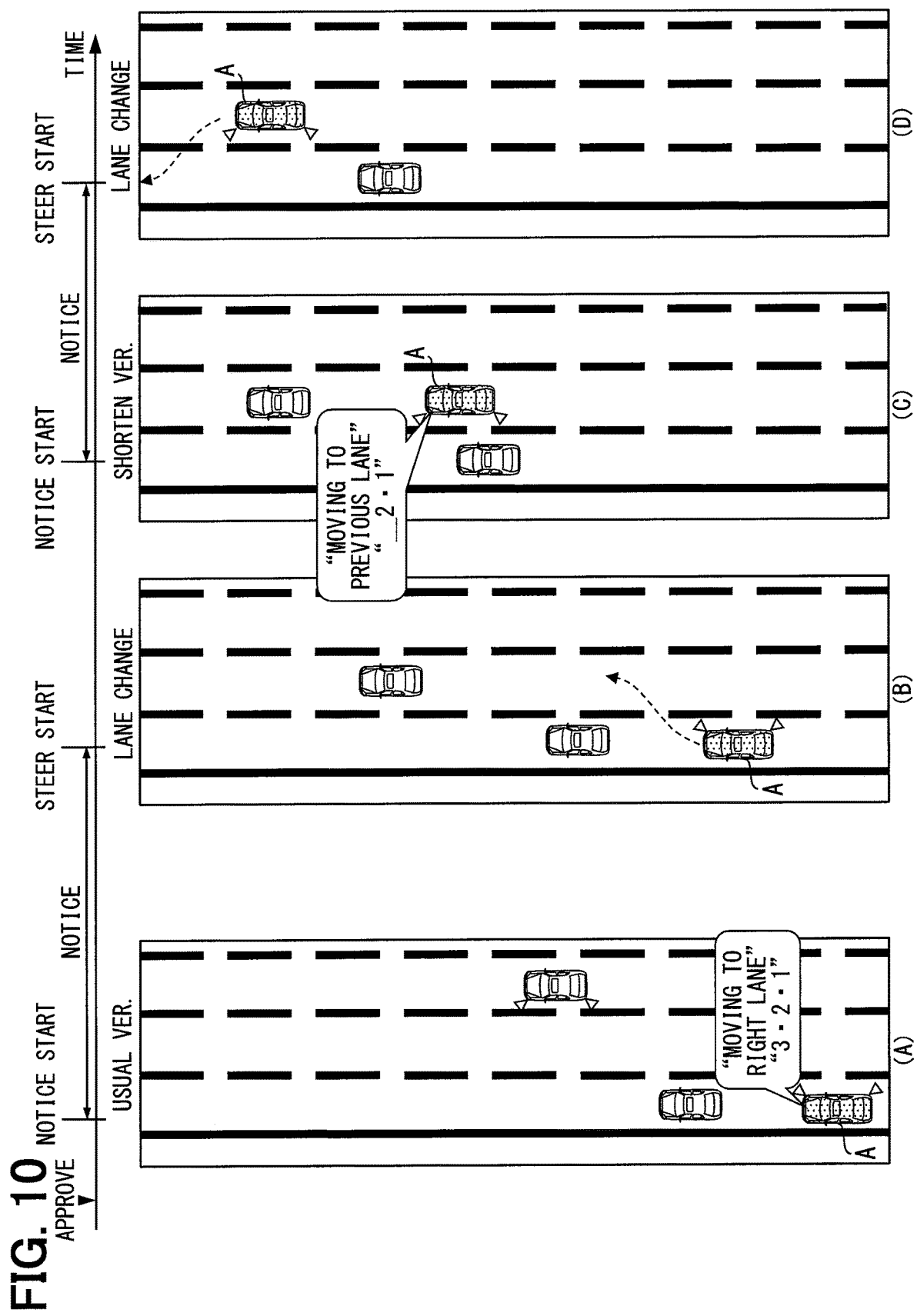
FIG. 10 is a diagram illustrating another example of states where a plurality of lane changes of a vehicle are indicated with respective countdowns.

The following states indicated in FIG. 9 and FIG. 10 are scenes where the lane changes are performed in multiple times based on the intermediate-term travel plan. FIG. 9 illustrates a scene where after once moving from the lane located on the left side among three lanes to the intermediate lane, the vehicle A further moves to the passing lane on the right side. In the state indicated in FIG. 9, the procedure from the approval of the lane change up to the countdown start is substantially identical to that in the state explained with FIG. 8.

In response to the confirmation of a movable space of the vehicle A in the intermediate lane to which the vehicle A is going to move to enter, the countdown up to the steering start is started (refer to (A) of FIG. 9). When the lane changes in multiple times are planned, the countdown of a usual version is started before executing the first-time lane change. After completing the countdown, the LCA function part 83 starts the steering of the front wheel from the steering start point of time (refer to (B) of FIG. 9). In such a way, the vehicle A starts the movement into the intermediate lane.

In response to the confirmation of a movable space of the vehicle A in the right-hand driving lane to which the vehicle A is going to further move to enter, the countdown up to the steering start is again started (refer to (C) of FIG. 9). Before the second-time lane change, the countdown of a shortened version is started. This countdown of the shortened version sets the notice continued duration from the notice start point of time up to the steering start point of time to be shorter than that in the countdown of the usual version. The guidance related to the second-time countdown is thus such as "starting the movement to the right lane" and "2, 1", or "moving to right lane" and "2, 1". After completing the second-time countdown, the LCA function part 83 starts the steering of the front wheel from the steering start point of time (refer to (D) of FIG. 9). In such a way, the vehicle A starts the movement into the right-hand passing lane. Note that before the start of the second-time countdown, the approval manipulation may be again required to the driver.

FIG. 10 illustrates a scene where after once moving from the lane located on the left side among three lanes to the intermediate lane, the vehicle A returns to the left lane. The procedure up to the completion of the first-time lane change is substantially identical to that in the state indicated in FIG. 9 (refer to (A) and (B) of FIG. 10). In response to the confirmation of a movable space of the vehicle A in the left lane after moving to the intermediate lane, the countdown up to the steering start is started again (refer to (C) of FIG. 10). The guidance related to the second-time countdown corresponds to the shorten version, such as "starting the movement to the previous lane" and "2, 1", or "moving to previous lane" and "2, 1". After completing the second-time countdown, the steering of the front wheel is started from the steering start point of time (refer to (D) of FIG. 10). In such a way, the vehicle A starts the movement into the previous left lane.

Figure 11:
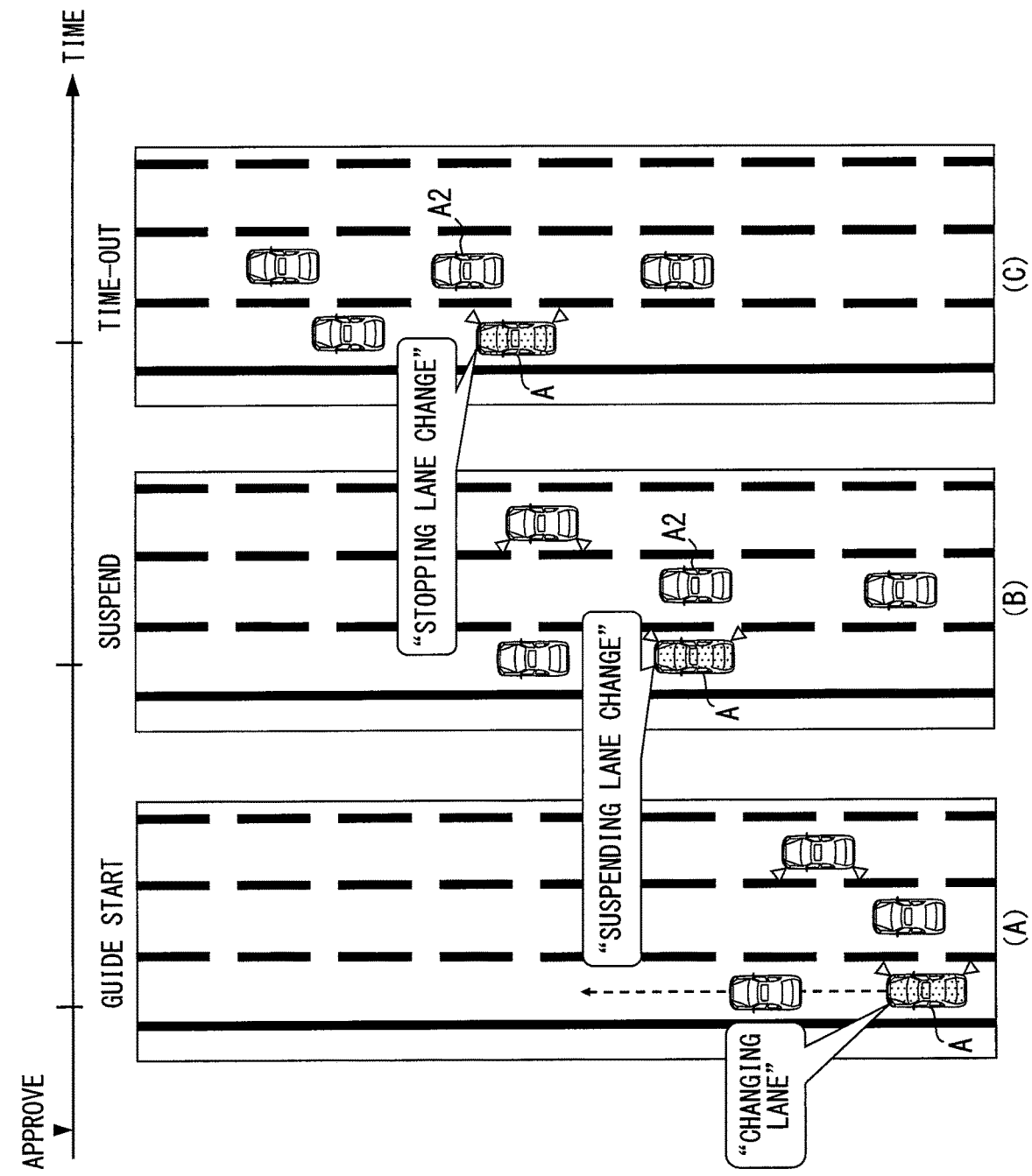
FIG. 11 is a diagram illustrating states where a lane change is interrupted due to a timeout.

The state in FIG. 11 corresponds to a scene where the presence of a parallel-traveling vehicle A2 causes the suspended state of the lane change to continue. In this scene, the guidance of "suspending lane change due to a vehicle in the adjacent lane" is reproduced to be announced inside of the vehicle compartment (refer to (B) of FIG. 11). Furthermore, suppose that even if a predetermined time continues, a space enabling a lane change is not secured in the lane to which the vehicle A is trying to move. In such a case, the assistance of the present-time lane change is cancelled due to the timeout. When the lane change is cancelled due to the timeout, the guidance of "stopping lane change" is reproduced to be announced inside of the vehicle compartment (refer to (C) of FIG. 11).

Figure 12:
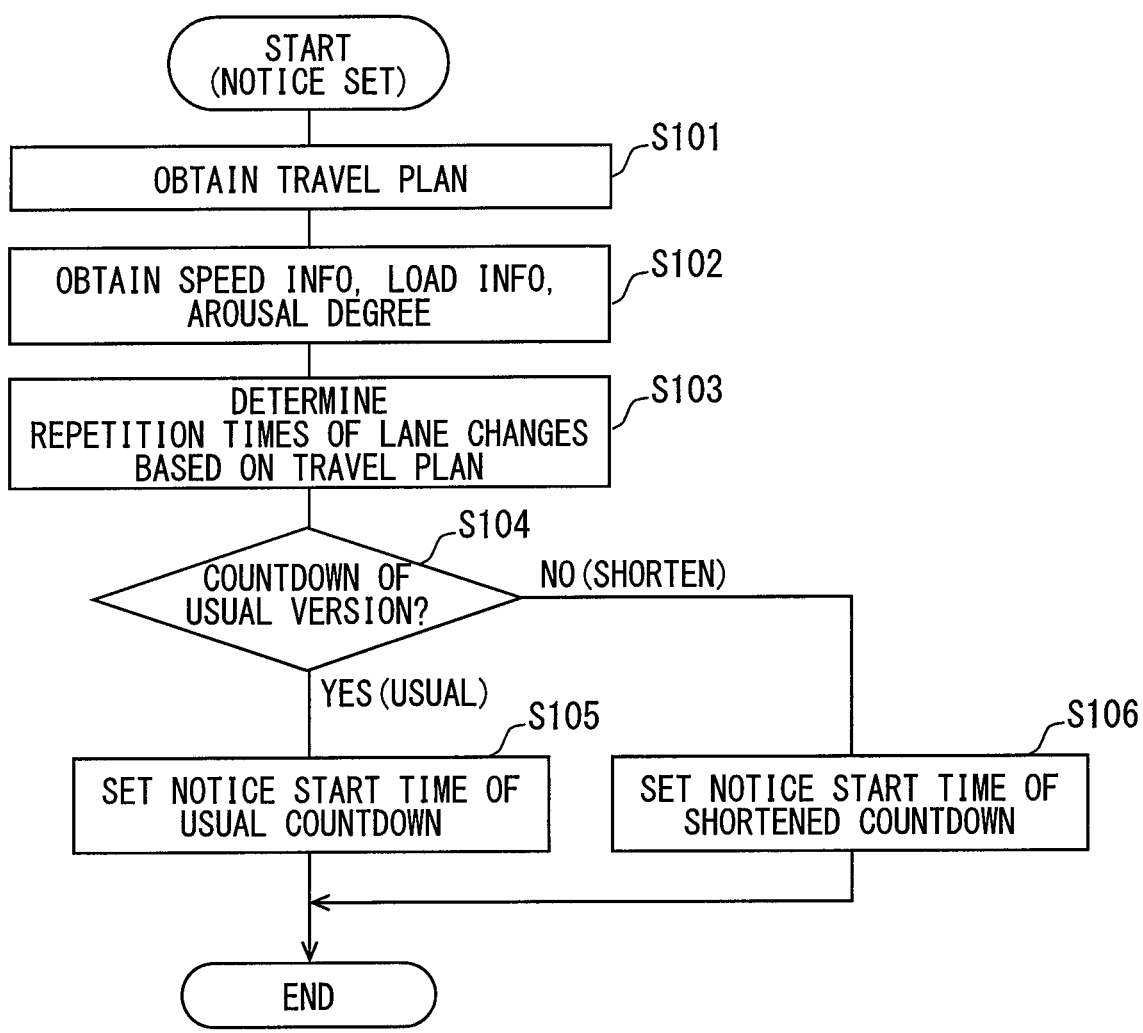
FIG. 12 is a flowchart illustrating a notice setting process by a notice adjuster section.
Figure 13:
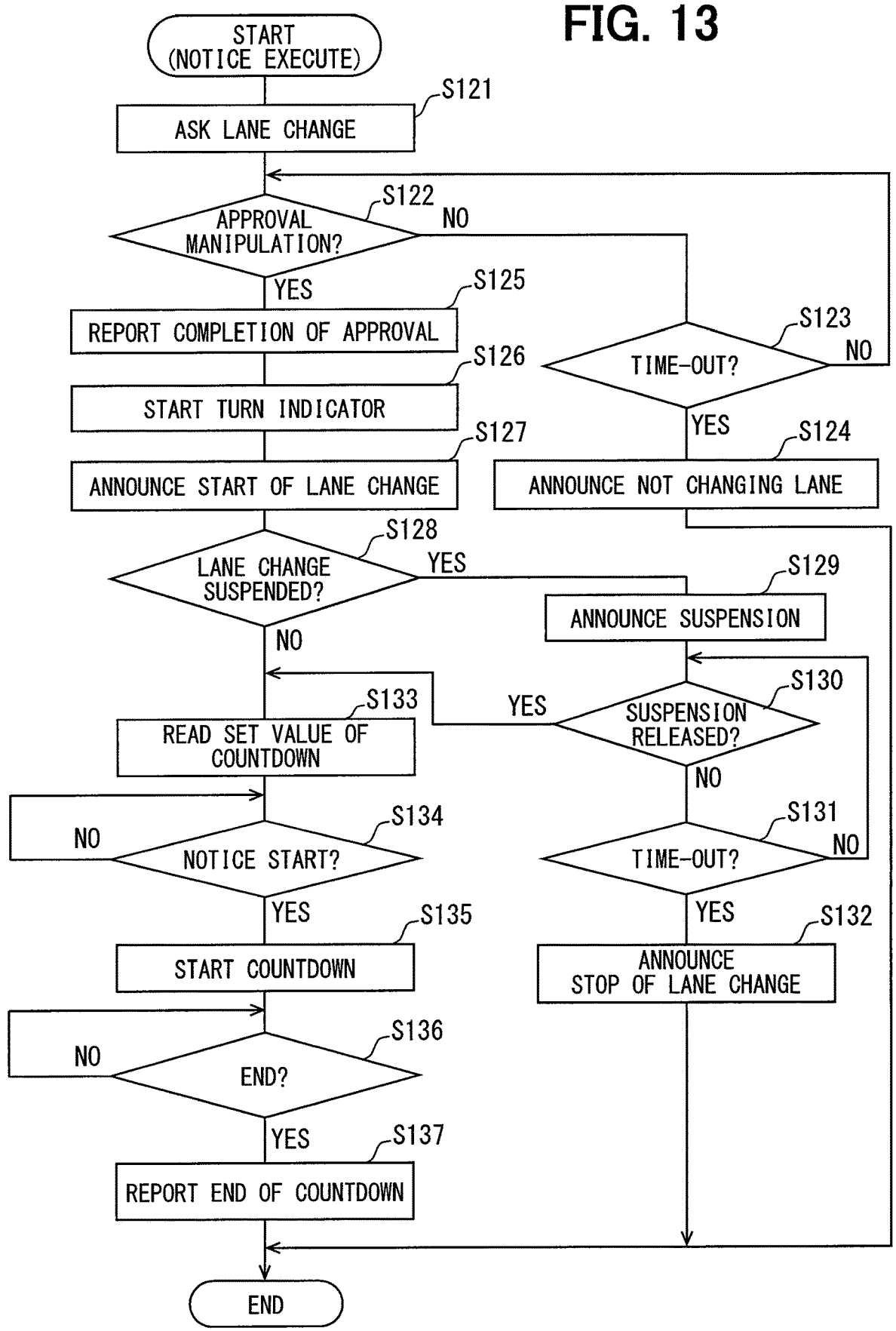
FIG. 13 is a flowchart illustrating a notice execution process by a notice adjuster section.

The following explains details of processes by the control circuit 20a to achieve the above-explained notice of countdown by a notice management method based on FIG. 12 and FIG. 13 while referring to FIG. 1 and FIG. 2. First, based on a flowchart of FIG. 12, a notice setting process which sets a countdown according to states is explained. The notice setting process indicated in FIG. 12 is started by the notice adjuster section 35 each time the LCA function part 83 intends to change lanes.

It is further noted that a flowchart described includes sections (also referred to as steps), which are represented, for instance, as S101. Further, each section can be divided into several sections while several sections can be combined into a single section. Each section may be referred to as a device or a specific name, or with a structure modification; for instance, a start time obtainer section may be also referred to as a start time obtainer device, or a start time obtainer. Further, each section can be achieved not only (i) as a software section in combination with a hardware unit (e.g., computer), but also (ii) as a section of a hardware circuit (e.g., integrated circuit, hard-wired logic circuit), including or not including a function of a related apparatus. Further, the section of the hardware circuit may be inside of a microcomputer.

At S101, the notice adjuster section 35 obtains a travel plan generated by the travel planner section 84 via the travel plan obtainer section 31, then proceeding to S102. At S102, the current travel speed information, the driver's driving load information, and arousal degree information are obtained; then the sequence proceeds to S103. At S103, based on the travel plan obtained at S101, the repetition times of lane changes performed by the LCA function part 83 is determined; then, the sequence proceeds to S104.

At S104, it is determined whether the countdown of the usual version is executed based on the determination result at S103. At S103, when the lane changes are performed less than predetermined threshold repetition times, the countdown of the usual version is selected. For example, it is the case planning only one lane change of the vehicle A moving from one lane of a traveling lane and a passing lane to the other lane (refer to FIG. 8).

Furthermore, even when the lane changes are performed in multiple times equal to or greater than predetermined threshold repetition times, the countdown of the usual version is selected in the first-time lane change among the multiple-time lane changes (refer to (B) of FIG. 9, and (B) of FIG. 10). In those cases, at S105, the notice start point of time for the countdown of the usual version is set based on the travel plan obtained at S101 and each information obtained at S102; then the notice setting process is ended.

In contrast, suppose the case where the lane changes are performed in multiple times and the currently planned lane change corresponds to the lane change at the second time or after the second time. In this case, at S104, the countdown of the shortened version is selected. In this case, at S106, the notice start point of time for the countdown of the shortened version is set based on the travel plan obtained at S101 and each information obtained at S102; then the notice setting process is ended.

The following explains the details of a notice execution process based on FIG. 13. The notice execution process executes the countdown on which the setup by the notice setting process (refer to FIG. 12) is reflected. Similar to the notice setting process, the notice execution process indicated in FIG. 13 is started by the notice adjuster section 35 each time the LCA function part 83 intends to change lanes.

At S121, the driver is asked whether the execution of a lane change is allowed; then, the sequence proceeds to S122. At S122, it is determined whether there is an approval manipulation by the driver to the steering switch 16a. When it is determined that there is no approval manipulation at S122, the sequence proceeds to S123. In S123, it is determined whether the waiting period of time for the approval manipulation reaches a time-out period. By repeating S122 and S123, a waiting state for an input of the approval manipulation is maintained.

When it is determined that the time-out period elapses without any input of the approval manipulation, the sequence proceeds to S124. At S124, a notice indicating that a lane change is not executed is announced; then, the notice execution process is ended. By contrast, when the approval manipulation is inputted before the waiting period reaches the time-out period, the sequence proceeds to S125.

At S125, the notice indicating the completion of the approval of the lane change by the driver is reported to the LCA function part 83; then, the sequence proceeds to S126. The notice at S125 permits the LCA function part 83 to move to the state where the execution of the lane change is enabled. At S126, the operation of the turn indicator corresponding to the moving direction of the vehicle A is started (refer to (A) of FIG. 9); then, the sequence proceeds to S127. At S127, the lane change start is announced by speech in the vehicle compartment (refer to (A) of FIG. 9); then, the sequence proceeds to S128.

At S128, it is determined whether the lane change is under a suspended state by the LCA function part 83. When the lane change is not suspended, the sequence proceeds to S133. By contrast, when the parallel-traveling vehicle A2 is in the lane to which the vehicle A is going to move and the lane change is thus suspended, the sequence proceeds to S129. At S129, the lane change being suspended is announced by speech in the vehicle compartment (refer to (B) of FIG. 9); then, the sequence proceeds to S130. At S130 and S131, the release of the suspended state of the lane change is waited. When it is determined that the suspended state is released before the time-out period elapses, the sequence proceeds to S133. By contrast, when the waiting period reaches the time-out period due to the suspended state being continued, the sequence proceeds to S132. At S132, stopping of the lane change is announced by speech in the vehicle compartment (refer to (C) of FIG. 11); then, the notice execution process is ended.

At S133, the set value of the countdown set in the notice setting process (refer to FIG. 12) is read; then, the sequence proceeds to S134. At S134, by repeating the determination of whether the start point of time of the countdown read at S133 arrives, the sequence waits until the notice start point of time. When the notice start point of time arrives, the sequence proceeds to S135.

At S135, the countdown is started from the value based on the set value read at S133 (refer to such as (C) of FIG. 9); then, the sequence proceeds to S136. The countdown started at S135 enables the driver to be notified of the decrease in the residual period of time up to the steering start point of time. At S136, by repeating the determination of the end of the countdown started at S135, the end of the countdown is waited. When the countdown is completed, the sequence proceeds to S137. At S137, the end of countdown is reported to the LCA function part 83; then, the notice execution process is ended. Based on the notice at S125, the LCA function part 83 starts steering of the front wheel (refer to such as (D) etc. of FIG. 9).

In the first embodiment described so far, the HUD apparatus 14 and the audio speaker 15 which are controlled by the notice adjuster section 35 can report continuously the decrease in the residual period of time until the steering start point of time at which the lane change is performed by the function of the LCA function part 83. The driver can thus recognize easily the point of time at which the vehicle starts to move in the lateral direction automatically for the lane change. The HCU 20 can thus reduce an uneasiness of an occupant including the driver in the vehicle A that changes a lane with a driving assistance function of the vehicle control ECU 70.

In addition, in the first embodiment, the notice start point of time for the lane change is made earlier as the driver is in the state of needing more time in order to recognize the notice of the lane change. As a result, the driver can recognize the information relating to the lane change while having more time to spare. The above-explained configuration enables the start of the steering to be executed after the driver sufficiently understands the information on the start of the lane change. The driver thus becomes less prone to feel uneasy to the lane change by the driving assistance function.

Note that the driver needs more time to recognize the notice of the lane change as the travel speed of the vehicle A becomes faster. In the first embodiment, the notice start point of time is thus made earlier as the travel speed of the vehicle A becomes faster. According to the above, the driver can recognize the information indicating the start of the lane change while having more time to spare. Therefore, the driver's uneasiness can be reduced more effectively.

Furthermore, the driver needs more time to recognize the notice of the lane change as the driving load becomes greater. In the first embodiment, the notice start point of time is made earlier as the driving load becomes greater. Furthermore, the driver needs more time to recognize the notice of the lane change as the driver has a lower arousal degree like in the careless state or drowse state due to fatigue. In the first embodiment, the notice start point of time is made earlier as the driver has a lower arousal degree. According to the above, the driver can recognize the information relating to the start of the lane change while having more time to spare. Therefore, the driver's uneasiness can be reduced more effectively.

In addition, in the first embodiment, the residual period of time up to the steering start point of time is reported by countdown of numeric characters. The driver can thus easily recognize the point of time at which the vehicle A moves in a lateral direction. According to the above, the effect of reducing the occupant's uneasiness is demonstrated much more certainly.

In addition, in the first embodiment, the notice start point of time is made earlier by increasing the numerical value which starts the countdown. This increases the notice continued duration relating to the countdown without providing the driver with the sense of incongruity, thereby setting the notice start point of time to have a longer preliminary interval before the steering start point of time.

In addition, in the first embodiment, suppose that the intermediate-term travel plan determines multiple-time executions of lane changes. In this case, the notice continued duration in the lane change at and after the second time is made shorter than that at the first time. Such setting allows the driver to be less prone to feel the countdown troublesome.

In addition, in the first embodiment, the residual period of time is reported by speech. This enables the driver to understand the residual period of time up to the steering start easily even while monitoring the periphery of the vehicle A. Thus, in order for the driver to recognize the point of time at which the vehicle A starts moving in a lateral direction, the notice with speech is suitable.

In addition, in the first embodiment, the residual period of time is reported by virtual image display using the HUD apparatus 14. This allows the driver to understand certainly the residual period of time up to the steering start by seeing the display even if the state takes place where the noises accompanying the travel cause the speech to be hard to hear. Furthermore, the virtual image display superimposed on a front scenery enables the driver to understand the residual period of time up to the steering start easily even while monitoring the periphery of the vehicle A. As mentioned above, the virtual image display by the HUD apparatus 14 is suitable for the notice of the countdown up to the steering start.

Note that in the first embodiment, the HUD apparatus 14 is equivalent to a "display unit", the audio speaker 15 is equivalent to a "sound output interface", the HCU 20 is equivalent to a "notice management apparatus", and the main processor 21 and the drawing processor 22 are each equivalent to a "processor." In addition, the travel plan obtainer section 31 is equivalent to a "start time obtainer section" or a "start time obtainer", and the vehicle control system 60 is equivalent to a "vehicle control apparatus." Furthermore, S101 in the notice control program is equivalent to "start time obtaining" or "start time obtaining procedure", and S135 is equivalent to "notice adjusting" or "notice adjusting procedure" and also "notice controlling", or "notice controlling procedure."

Second Embodiment

A second embodiment of the present disclosure is a modification example of the first embodiment. The vehicle control system 260 (refer to FIG. 2) in the second embodiment can perform the driving assistance whose automation level is higher than that in the first embodiment. In detail, the vehicle control system 260 can achieve automatic driving providing an automation level corresponding to "the driving mode-specific performance by an automated driving system of all aspects of the dynamic driving task with the expectation that the human driver will respond appropriately to a request to intervene." Such a vehicle control system 260 can start a lane change, without receiving any approval from the driver (operator). This allows a notice execution process in the second embodiment to omit S121 to S125 relating to the approval from the driver in the notice execution process in the first embodiment (refer to FIG. 13).

The vehicle under such an above autonomous travel causes the steering start point of time for the lane change to be reported not only to the driver but also to another occupant. That is, the HCU 220 (refer to FIG. 2) in the second embodiment displays the countdown not only by the HUD apparatus 14 but also by the CID 13. The following explains details of each display by each of the HUD apparatus 14 and the CID 13 accompanying the execution of the lane change by the driving assistance function.

Figure 14:
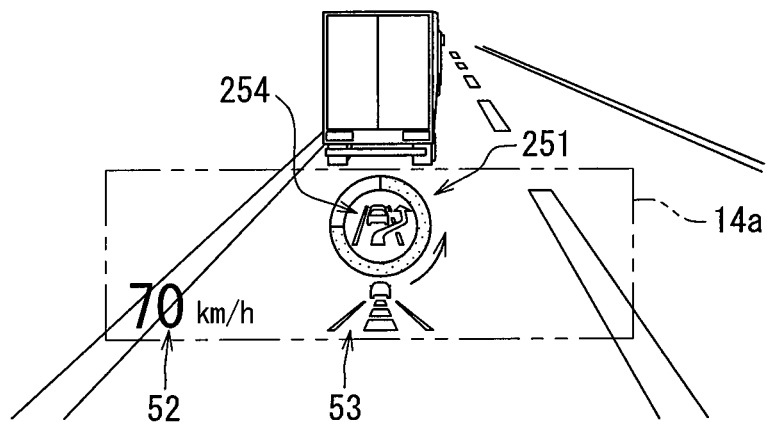
FIG. 14 is a diagram illustrating a view of a countdown by an HUD apparatus according to a second embodiment.
Figure 15:
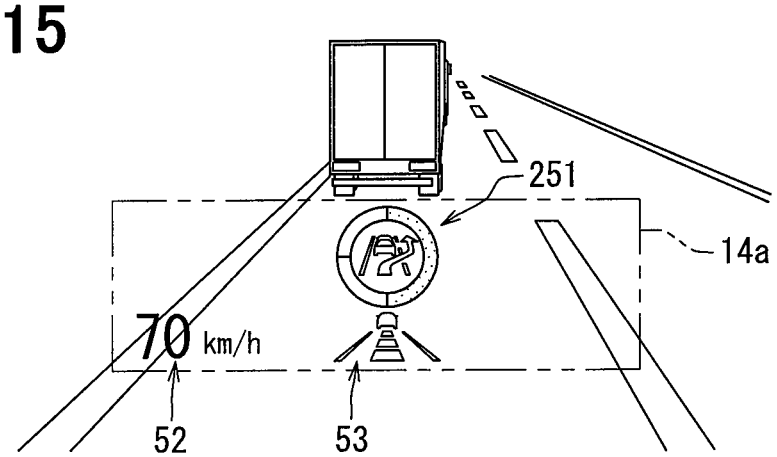
FIG. 15 is a diagram illustrating a view of a countdown one second after FIG. 14.
Figure 16:
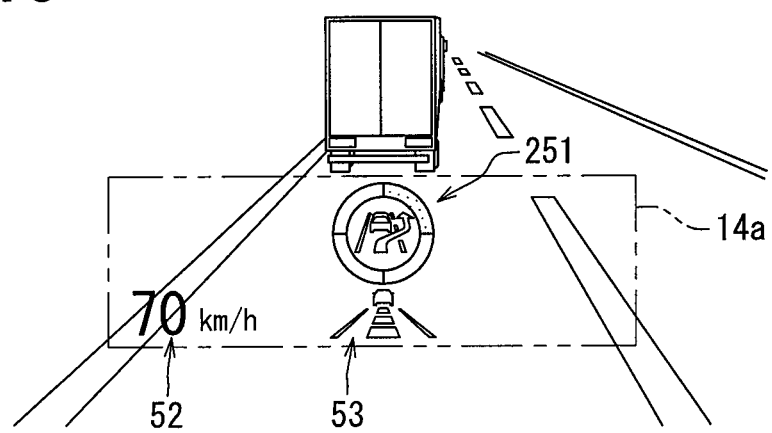
FIG. 16 is a diagram illustrating a view of a countdown one second after FIG. 15 and just before a start of a lane change.

As indicated in FIG. 14 to FIG. 16, the projection area 14a performs a virtual image display of an LCA indicator 254 and a countdown display part 251, in addition to the speed display part 52 and the ACC/LKA indicator 53 that are substantially identical to those in the first embodiment. The LCA indicator 254 is located inside of the countdown display part 251.

The countdown display part 251 is an image shaped of a circular ring having a line width broader than that of the ring image 51b (refer to FIG. 5) in the first embodiment. The countdown display part 251 is provided such that the circular ring is divided into a plurality (four) of circular arc segments. The countdown display part 251 reduces one segment by one segment per second in counter clockwise; the segment emits light with high luminosity (black in drawing), thereby reporting the residual period of time until the lateral movement accompanying the lane change is started. As mentioned above, the countdown display part 251 forms a circular progress bar that is shrunken counter clockwise with a passage of time from the state extended to all the circumference of the circular ring.

Figure 17:
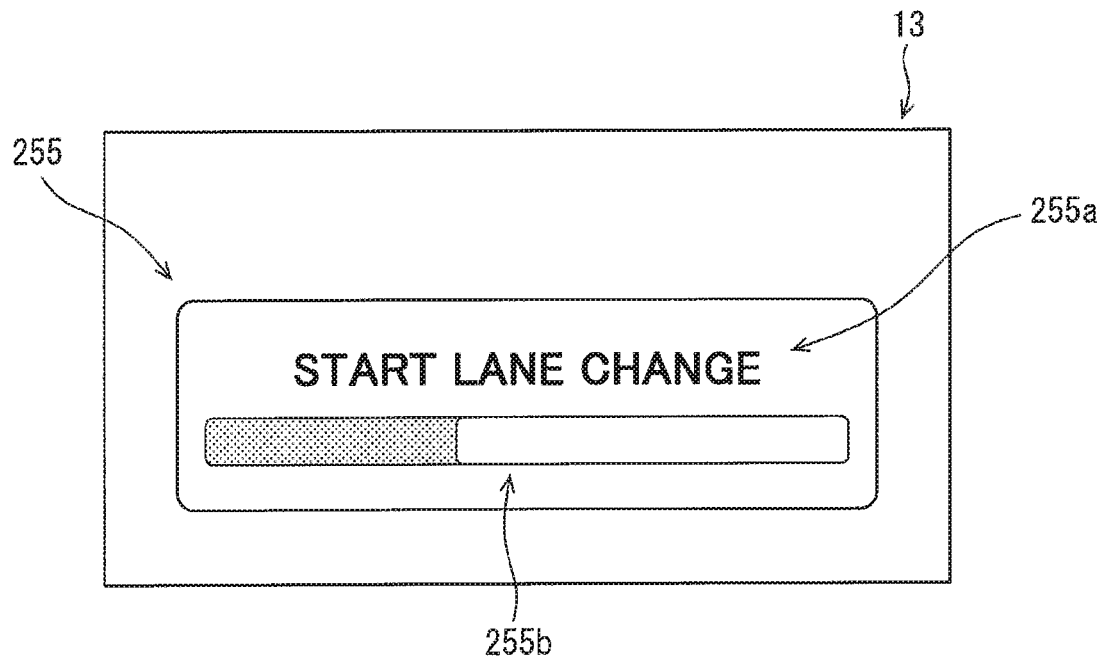
FIG. 17 is a diagram illustrating a view of a countdown indicated to a fellow passenger with a CID according to the second embodiment.

As indicated in FIG. 17, the countdown display part 255 displayed in the CID 13 includes a message image 255a and a progress bar 255b. The message image 255a includes a text such as "starting lane change." The progress bar 255b is an image extended belt-like along the longer direction in the display screen of the CID 13. The progress bar 255b has a high luminance region (white in the drawing), and a low luminance area (dots in the drawing). The progress bar 255b reports the reduction of the residual period of time up to the lane change by extending the low luminance region while reducing the high luminance region. The superimposed display of the countdown display part 255 is carried out to a screen view having been displayed on the CID 13 till then, such as an audio menu screen view or a map screen view.

In addition, in the second embodiment, the countdown is performed repeatedly by the notice sounds each of which is reproduced from the audio speaker 15 one time per second. The notice sound is a single sound or chord sound, which has a sounding period less than one second. The HCU 220 increases the pitch of the notice sound gradually as approaching closer to the steering start point of time. This pitch of the notice sound allows the driver to recognize the approach to the steering start point of time.

Even in the second embodiment described above, the reduction of the residual period of time up to the lane change is continuously reported by the CID 13 and the audio speaker 15. As a result, the point of time at which the vehicle A starts to move can be understood easily; thereby, the uneasiness of the occupant including the driver may be reduced. Further, the second embodiment provides a countdown in which the pitch of the notice sound is changed. Even such a countdown allows the occupant including the driver to understand the approach to the steering start point of time certainly.

Note that in the second embodiment, the HUD apparatus 14 and the CID 13 are each equivalent to a "display unit", the HCU 220 is equivalent to a "notice management apparatus", and the vehicle control system 260 is equivalent to a "vehicle control apparatus."

Third Embodiment

Figure 18:
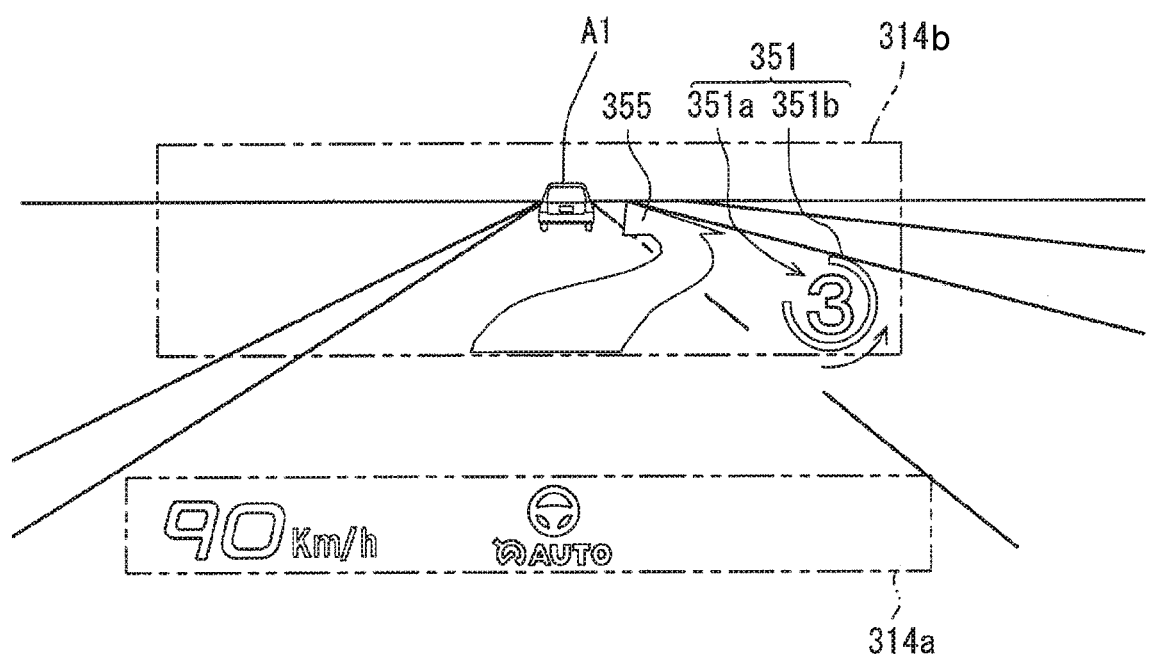
FIG. 18 is a diagram illustrating a view of a countdown by an HUD apparatus according to a third embodiment.

A third embodiment of the present disclosure is another modification example of the first embodiment. The HUD apparatus 14 (refer to FIG. 1) of the third embodiment projects a virtual image onto a first projection area 314a and a second projection area 314b, as illustrated in FIG. 18. The first projection area 314a is defined in a position in front of the driver's both eyes within the windshield 18. The image projected onto the first projection area 314a is mainly superimposed on an ahead-travelling vehicle A1 and a road surface in the heading direction, etc., and achieves an AR (Augmented Reality) indication. The light of the image projected onto the first projection area 314a is formed at a position which is more distant from the windshield 18 than that of the light of the image projected onto the second projection area 314b, for example, the position ahead of the driver seat 17d by about 15 meters. The second projection area 314b is defined in a position lower than the first projection area 314a within the windshield 18. The second projection area 314b performs a virtual image display of the speed display part 52 and the LCA indicator 54, like in the projection area 14a (refer to FIG. 1) of the first embodiment.

In the first projection area 314a, a scheduled locus display part 355 and a countdown display part 351 are projected as the image for an advance notice of the lane change. The scheduled locus display part 355 indicates a scheduled travel locus of the vehicle A (refer to such as (D) of FIG. 8) set by the travel planner section 84 (refer to FIG. 2). The scheduled locus display part 355 is displayed like an arrow drawn on an actual road surface.

The countdown display part 351 is displayed on a lower corner part in the first projection area 314a so as not to overlap with an ahead-travelling vehicle A1. The countdown display part 351 includes a numerical image 351a and a ring image 351b. The numerical image 351a displays the numeric character which decreases the value by one per second like the numerical image 51a (refer to FIG. 5) of the first embodiment. The ring image 351b is formed to be shaped of a circular ring surrounding the numerical image 351a like the ring image 51b (refer to FIG. 5) of the first embodiment. The ring image 351b decreases a central angle from 360 degrees to zero per second, and counts down the residual period of time up to the lane change along with the numerical image 51a. The ring image 351b, which is shrunken counter clockwise, synchronizes with the change of the numerical value of the numerical image 351a, and returns to the shape of the circular ring.

In the above third embodiment, the methods for adjusting the countdown making the notice start point of time earlier is different from that of the first embodiment. In detail, a period of time required to count one numeric character is adjusted in the countdown of "3, 2, 1" by the digital display of the countdown display part 351 and the sound guidance of the audio speaker 15 (refer to FIG. 2). That is, when the notice start point of time is made earlier, the countdown is executed which decreases one numeric character per 1.5 second, for example.

Even in the third embodiment described above, the reduction of the residual period of time up to the lane change is continuously reported by the virtual image display by the first projection area 314a and the sounds by the audio speaker 15. As a result, the occupant of the vehicle A can understand easily the point of time at which the vehicle A begins to move; thus, the uneasiness of the occupant of the vehicle A can be reduced.

Other Embodiments

Up to this point, description has been given to the embodiments of the present disclosure. However, the present disclosure is not limited to the above embodiments, and it can be variously embodied within a scope not departing from essential points of the present disclosure.

In the above embodiments, the start point of time of a notice such as a countdown is made earlier when the driver is under states of needing more time to recognize the notice. In contrast, the notice continued duration from the notice start point of time to the steering start point of time may be set to be constant, regardless of the state. In addition, the length of notice continued duration may be made adjustable by the driver's input. Furthermore, the detection value used for adjusting the notice continued duration is not limited to the vehicle speed, the driving load, or the degree of arousal. In addition, the length of notice continued duration is adjustable depending on the kind of the road, for example. For example, the notice continued duration in a general road may be shorter than that in an expressway, to achieve a quick lane change.

In the above first and third embodiments, the reduction in the residual period of time is indicated by the display of the countdown. In addition, in the above second embodiment, the reduction in the residual period of time is indicated by the display of the progress bar to shrink. As mentioned above, the mode of the display which indicates the residual period of time up to the steering start can be changed suitably. For example, both the numeric character and the progress bar may be put in order and displayed on the display screen of the CID. Furthermore, the display unit which indicates the reduction in the residual period of time is not limited to a CID or an HUD apparatus. For example, the numeric character of countdown can be displayed also on a combination meter. Note that when the countdown is performed using a plurality of display units, the reductions of the respective numeric characters are desired to precisely synchronize with each other.

Like the above embodiments, the sound volume of the sound which reports the reduction in the residual period of time may be constant or enlarged gradually. In addition, only the driver may be allowed to hear the countdown by using an ultrasonic wave speaker, for example. Furthermore, the sound of the countdown may be changed by the driver from two or more kinds previously set. Alternatively, the reduction in the residual period of time may be reported by only either the sound or the display.

In the above embodiments, a notice of tactile sense by the footrest control apparatus is performed in parallel with the countdown by sound and display. However, the countdown up to the steering start may be executed only by the notice of tactile sense which changes a vibration frequency. In addition, the vibration frequency of the vibration performing the notice of tactile sense may be increased step by step like the above embodiments, or decreases step by step as following the reduction of the residual period of time up to the steering start. Furthermore, the frequency of vibration may be increased or decreased gradually instead of step by step. In addition, the mode of vibration performing the notice of tactile sense may be intermittent or continuous.

In the above embodiments, the rim part of the steering wheel is made to generate vibration. However, the part performs the notice of tactile sense due to the vibration may be any part which the occupant touches, without need to be limited to the rim part of the steering wheel. For example, a seat vibrating apparatus making the driver sense the vibration via a seat surface part or a seat back part of the driver seat or the passenger seat may be provided as a notice instrument. Furthermore, the notice of tactile sense may be winding up the seat belt. In addition, each component which presents the tactile sense may be omitted.

In the above embodiments, when the lane changes are performed repeatedly, the countdown at the second time or after the second time is used as a shortened version. However, even when the lane changes are repeated, each countdown may be performed to have the same time length. Furthermore, the countdown is performed only at the first time, whereas the sound at and after the second time may be a chord sound whose pitch is changed like in the above second embodiment.

In the above embodiments, the function provided by the main processor 21 and the drawing processor 22 of the HCU 20 may be provided by hardware or software different from the above-mentioned, or any combination of hardware and software. For example, in an in-vehicle network omitting the HCU 20, the control circuit of the vehicle control ECU, the control circuit of the combination meter, or the control circuit of the CID may execute some or all of the notice setting process or the notice execution process. Furthermore, each function may be provided by hardware or software different from the above-mentioned, or any combination of hardware and software. In addition, the memory which stores the program executed by each processor 21 and 22 may include a non-transitory tangible storage media such as a flash memory, a hard disk.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

The invention claimed is:

1. A notice management apparatus controlling a notice instrument that provides a notice to an occupant of a vehicle, the notice instrument being mounted to the vehicle together with a vehicle control apparatus providing a lane change assistance function assisting a lane change of the vehicle by generating a steering force to move the vehicle to an adjacent lane, the notice management apparatus comprising:
a control circuit configured to
obtain (i) information indicating a steering start point of time at which a lane change of the vehicle is started by the lane change assistance function of the vehicle control apparatus, and (ii) information indicating at least a state of the vehicle to calculate a notice start point of time at which a notice to the occupant is started before the steering start point of time, and
cause the notice instrument to provide continuously the notice to the occupant in a notice continued duration from the notice start point of time to the steering start point of time, the notice indicating a decrease in a residual period of time up to the steering start point of time in the notice continued duration.

2. The notice management apparatus according to claim 1, wherein
when the occupant is under states of needing more time to recognize the notice indicating the lane change, the notice start point of time is set to have a longer interval up to the steering start point of time.

3. The notice management apparatus according to claim 2, wherein:
the control circuit is further configured to obtain information indicating a travel speed of the vehicle; and
wherein as the travel speed is greater, the notice start point of time is set to have a longer interval up to the steering start point of time.

4. The notice management apparatus according to claim 2, wherein:
the control circuit is further configured to obtain information indicating a driving load of a driver of the vehicle; and
wherein as the driving load of the driver is greater, the notice start point of time is set to have a longer interval up to the steering start point of time.

5. The notice management apparatus according to claim 2, wherein:
the control circuit is further configured to obtain information indicating an arousal degree of a driver of the vehicle; and
wherein as the arousal degree of the driver is less, the notice start point of time is set to have a longer interval up to the steering start point of time.

6. The notice management apparatus according to claim 1, wherein
the control circuit causes the notice instrument to perform a countdown that decreases a number as the residual period of time up to the steering start point of time decreases.

7. The notice management apparatus according to claim 6, wherein
the control circuit sets the notice start point of time to have a longer interval up to the steering start point of time by increasing a numerical value with which the countdown is started.

8. The notice management apparatus according to claim 1, wherein
when the vehicle control apparatus performs lane changes repeatedly, the control circuit makes a duration of continuing a notice indicating a residual period of time up to a second lane change less than a duration of continuing a notice indicating a residual period of time up to a first lane change that is followed by the second lane change.

9. The notice management apparatus according to claim 1, wherein
the control circuit notifies the occupant of a residual period of time up to a lane change via sound by controlling a sound output interface included in the notice instrument.

10. The notice management apparatus according to claim 9, wherein
the control circuit changes a pitch of the sound of the notice as the residual period of time up to the lane change decreases.

11. The notice management apparatus according to claim 1, wherein
the control circuit notifies the occupant of a residual period of time up to a lane change via display by controlling a display unit included in the notice instrument.

12. The notice management apparatus according to claim 1, wherein
the notice instrument includes a vibrator providing a vibration in a part which the occupant touches; and
the control circuit notifies the occupant of a residual period of time up to a lane change by a control that changes a frequency of the vibration provided by the vibrator.

13. A notice management method for managing a notice by a notice instrument providing a notice to an occupant of a vehicle, the notice instrument being mounted to the vehicle together with a vehicle control apparatus providing a lane change assistance function assisting a lane change of the vehicle by generating a steering force to move the vehicle to an adjacent lane,
the notice management method being executed by at least one processor,
the notice management method comprising:
obtaining (i) information indicating a steering start point of time at which a lane change of the vehicle is started by the lane change assistance function of the vehicle control apparatus, and (ii) information indicating at least a state of the vehicle to calculate a notice start point of time at which a notice to the occupant is started before the steering start point of time; and
causing the notice instrument to provide the notice to the occupant continuously in a notice continued duration from the notice start point of time to the steering start point of time, the notice indicating a decrease in a residual period of time up to the steering start point of time in the notice continued duration.

14. The notice management apparatus according to claim 1, wherein
in response to the occupant having approved the lane change by the vehicle control apparatus, the control circuit causes the notice instrument to provide continuously the notice indicating the decrease in the residual period of time up to the steering start point of time.

15. The notice management apparatus according to claim 1, wherein
based on the information indicating the steering start point of time at which the lane change of the vehicle is started, the control circuit is configured to cause the notice instrument to provide continuously the notice indicating the decrease in the residual period of time up to a point of time when the vehicle starts to move in a lateral direction for the lane change.

16. The notice management apparatus according to claim 1, wherein
the control circuit is configured to control a display included in the notice instrument to display a content indicating a scheduled travel locus to the lane change to appear on a road surface.

17. A notice management apparatus controlling a notice instrument configured to provide notice to an occupant of a vehicle such that the occupant recognizes when the vehicle will start a lane change, the notice instrument being mounted to the vehicle together with a vehicle control apparatus configured to provide an assistance function for assisting the lane change of the vehicle, the notice management apparatus comprising:
a control circuit configured to
obtain information indicating a steering start point of time at which a lane change of the vehicle will be started by the vehicle control apparatus, and
cause the notice instrument to continuously provide a notice indicating a decrease in a residual period of time up to the steering start point of time, the decrease in the residual period of time indicating to the occupant of the vehicle that the lane change will start at the steering start point of time such that the occupant recognizes when the vehicle will start the lane change,
wherein
when the occupant is under states of needing more time to recognize a notice indicating a lane change, the control circuit sets a notice start point of time to have a longer interval up to the steering start point of time, the notice start point of time being a point of time at which a notice of the residual period of time is started before the steering start point of time.

18. A notice management apparatus controlling a notice instrument that provides a notice to an occupant of a vehicle, the notice instrument being mounted to the vehicle together with a vehicle control apparatus providing a lane change assistance function assisting a lane change of the vehicle by generating a steering force to move the vehicle to an adjacent lane, the notice management apparatus comprising:
a control circuit configured to
obtain (i) control information on a steering control to a lane change of the vehicle started by the lane change assistance function of the vehicle control apparatus, and (ii) peripheral monitoring information on a different vehicle in the adjacent lane,
cause the notice instrument to provide continuously a notice indicating an approach up to start of movement for the lane change by the lane change assistance function of the vehicle control apparatus, based on the obtained control information, by performing countdown up to the start of movement using at least one of (i) a change of a notice sound, (ii) a decrease of a numeric value, and (iii) a progress bar, and
change, based on the obtained peripheral monitoring information, a notice start point of time at which the notice is started by the notice instrument.

19. The notice management apparatus according to claim 17, wherein
based on the information indicating the steering start point of time at which the lane change of the vehicle is started, the control circuit is configured to cause the notice instrument to provide continuously the notice indicating the decrease in the residual period of time up to a point of time when the vehicle starts to move in a lateral direction for the lane change.

20. The notice management apparatus according to claim 17, wherein the control circuit is configured to control a display included in the notice instrument to display a content indicating a scheduled travel locus to the lane change to appear on a road surface.

21. A notice management apparatus controlling a notice instrument that provides a notice to an occupant of a vehicle, the notice instrument being mounted to the vehicle together with a vehicle control apparatus achieving an assistance function assisting a lane change of the vehicle, the notice management apparatus comprising:
- a start time obtainer section configured to obtain information indicating a steering start point of time at which a lane change of the vehicle is started by the vehicle control apparatus; and
- a notice adjuster section configured to cause the notice instrument to provide continuously a notice indicating a decrease in a residual period of time up to the steering start point of time obtained by the start time obtainer section, wherein
- when the occupant is under states of needing more time to recognize a notice indicating a lane change, the notice adjuster section sets a notice start point of time to have a longer interval up to the steering start point of time, the notice start point of time being a point of time at which a notice of the residual period of time is started before the steering start point of time.

22. The notice management apparatus according to claim 18, wherein
- in response to the occupant having approved the lane change by the lane change assistance function of the vehicle control apparatus, the control circuit causes the notice instrument to provide continuously the notice indicating the approach up to the start of movement for the lane change.

23. The notice management apparatus according to claim 18, wherein:
- in response to the different vehicle being present around the adjacent lane, the control circuit causes the notice instrument to provide a notice suspending the lane change; and
- in response to the different vehicle being not present around the adjacent lane, the control circuit causes the notice instrument to start the countdown.

24. The notice management apparatus according to claim 18, wherein
- when the occupant is under states of needing more time to recognize a notice indicating a lane change, a notice start point of time is set to have a longer interval up to the steering start point of time, the notice start point of time being a point of time at which the notice is started before the steering start point of time.

* * * * *